(12) United States Patent  
Mori et al.

(10) Patent No.: US 7,815,007 B2
(45) Date of Patent: Oct. 19, 2010

(54) HOOD IMPACT ABSORBING APPARATUS

(75) Inventors: Shinji Mori, Gifu (JP); Yukio Nakagawa, Toyota (JP); Kazuyuki Yoshiyama, Nukata-gun (JP); Takeki Hayashi, Nishikasugai-gun (JP); Shigeyuki Suzuki, Nishikasugai-gun (JP)

(73) Assignees: Pacific Industrial Co., Ltd., Ogaki-shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/457,031

(22) Filed: May 29, 2009

(65) Prior Publication Data
US 2009/0302644 A1 Dec. 10, 2009

(30) Foreign Application Priority Data
Jun. 4, 2008 (JP) ............................. 2008-146987

(51) Int. Cl.
*B60K 28/10* (2006.01)
(52) U.S. Cl. ................................... 180/274
(58) Field of Classification Search .............. 180/274, 180/271; 296/187.03, 187.04, 193.11
See application file for complete search history.

(56) References Cited

U.S. PATENT DOCUMENTS

| 2005/0179286 A1* | 8/2005 | Adachi ................ 296/193.11 |
| 2009/0145681 A1* | 6/2009 | Hayashi et al. ............ 180/274 |
| 2009/0266638 A1* | 10/2009 | Hayashi et al. ............ 180/274 |

FOREIGN PATENT DOCUMENTS

JP         A-11-115680         4/1999

* cited by examiner

*Primary Examiner*—Faye M. Fleming
(74) *Attorney, Agent, or Firm*—Oliff & Berridge, PLC

(57) ABSTRACT

The present invention provides a hood impact absorbing apparatus capable of further mitigating an impact that a collision body receives from a hood than ever, wherein a push-up rod pushes up the rear end of a hood at the time of a collision of a vehicle, and when a collision body is battered against the top surface of the hood in this state, the rear end of the hood descends and the distal end of the push-up rod slidingly contacts and moves a rear-side flat portion and an arm intermediate curved portion in the rear end of the hood, and herein, a slide contact angle (θ) in the arm intermediate curved portion is larger than a slide contact angle (θ) in the rear end of the rear-side flat portion, thereby, during a process in which the rear end of the hood descends, peaks at which an absorbing amount of impact energy becomes large can be provided at least twice, and as a result, the impact can be mitigated further than ever.

20 Claims, 20 Drawing Sheets

HOOD IMPACT ABSORBING APPARATUS

BACKGROUND OF THE INVENTION

1. Field of the Invention

The present invention relates to a hood impact absorbing apparatus configured such that a rear end of a hood is pushed up at the time of a collision of a vehicle so as to allow the rear end of the hood to descend when a collision body such as a pedestrian is battered against the top surface of the hood, thereby mitigating the impact to the collision body.

2. Description of the Related Art

Conventionally, this type of a hood impact absorbing apparatus is configured such that a concave receiving surface is arranged on the undersurface of the rear end of a hood so as to bring a distal end of a push-up rod into contact with that surface. A side surface of the proximal end of the push-up rod is formed with a notch portion. When a collision body (e.g., a pedestrian) is battered against the top surface of the hood in a state where the push-up rod pushes up the rear end of the hood, the push-up rod is fractured at the notch portion, and by the fracture, the energy of the impact is absorbed (consumed) (for example, see JP-A1-H11-115680).

SUMMARY OF INVENTION

However, in the aforementioned conventional hood impact absorbing apparatus, the push-up rod is under load from the collision body in a state where a lateral deviation of the distal end is prevented by the concave receiving surface, and as a result, the load is an axial load oriented to an axial direction. A deforming amount from when the push-up rod receives the axial load to when it is fractured is very small as compared to a case where the push-up rod is deformed by receiving a bending load, for example. Thus, the impact energy is absorbed by the fracture of the push-up rod while the hood slightly descends, and thereby, the collision speed is rapidly decelerated. This makes it impossible to sufficiently mitigate the impact to the collision body.

The present invention was made in view of the aforementioned circumstances, and an object thereof is to provide a hood impact absorbing apparatus capable of further mitigating an impact that a collision body receives from a hood as compared to the conventional art.

In a hood impact absorbing apparatus (40) of claim 1, at the time of a collision of a vehicle (10), a push-up rod (52) is moved to an actuating position above a standby position and held at this position, and the rear end of a hood (13) is pushed up to an upper limit position. In this state, when a collision body (90) is battered against the top surface of the hood (13), the rear end of the hood (13) descends, the distal end (52H) of the push-up rod (52) slidingly contacts and moves along a first slide contact portion (34R) in the rear end of the hood (13), and the proximal end of the push-up rod (52) is folded. Thus, in the present invention, during a process of descending the rear end of the hood (13), the push-up rod (52) is gradually folded, and therefore, as compared to the conventional art, a deforming amount of the push-up (52) is larger, and thus the collision speed of the collision body (90) can be gradually decelerated. At this time, the impact energy is not only absorbed (consumed) by the bending deformation of the push-up rod (52), but is also absorbed by the movement (i.e., slide contact movement) while receiving friction between the distal end (52H) of the push-up rod (52) and the first slide contact portion (34R).

It is noted that according to the configuration of the present invention, when a change pattern of a slide contact angle (θ) of a route along which the distal end (52H) of the push-up rod (52) slidingly contacts and moves is modified in various ways, the impact absorbing pattern during the time that the rear end of the hood (13) descends from the upper limit position to the lower limit position can be set to a suitable pattern according to the various types of hoods (13) different in shape for each vehicle type.

Further, the distal end (52H) of the push-up rod (52) slidingly contacts and moves along the second slide contact portion (32W) after passing through the first slide contact portion (34R). Herein, in the first slide contact portion (34R), a slide contact angle (θ) that is an angle formed between a first vector (V1) oriented to a slide contact movement direction of the distal end (52H) of the push-up rod (52) and a second vector (V2) oriented from the proximal end of the push-up rod (52) to the distal end (52H) is decreased as the slide contact movement is advanced. The second slide contact portion (32W) is larger in slide contact angle (θ) than the terminal end of the first slide contact portion (34R). When the slide contact angle (θ) becomes larger, the pressing force of the distal end (52H) of the push-up rod (52) also becomes larger. Thus, the frictional force also becomes larger. That is, during the time that the distal end (52H) of the push-up rod (52) passes through the first slide contact portion (34R) and the second slide contact portion (32W), there are at least two peaks of frictional force. Thus, according to the present invention, during a process in which the rear end of the hood (13) descends, a peak at which the absorbing amount of the impact energy becomes large can be provided at least twice. This makes it possible for the collision body (90) to avoid receiving a large impact at once from the hood (13), and thus the impact can be further mitigated than the conventional art.

According to a configuration of claim 2, the push-up rod (52) swivels or is twisted, and the distal end (52H) of the push-up rod (52) moves along the second slide contact portion (32W). During the movement, the friction between the second slide contact portion (32W) and the distal end (52H) of the push-up rod (52) absorbs the impact energy, and thus the impact can be mitigated.

In the configuration of claims 3 and 4, the first slide contact portion (34R) is inclined upward toward the back, and when the distal end (52H) of the push-up rod (52) slidingly contacts and moves along the first slide contact portion (34R) rearward, the slide contact angle (θ) is gradually decreased. The second slide contact portion (32W) is folded downward from the rear end of the first slide contact portion (34R) so as to be inclined or curved downward toward the back, and thus the slide contact angle (θ) in the second slide contact portion (32W) is larger than the terminal end of the first slide contact portion (34R). In this way, as described above, the peaks at which the absorbing amount of the impact energy is large can be arranged at least twice.

In the configuration of claims 5 and 6, the push-up rod (52) ascends rearward and obliquely upward from the standby position to reach the actuating position, and thus the axial direction of the push-up rod (52) is reliably brought into an inclined state relative to the slide contact surface in the first slide contact portion (34R). Accordingly, at the time of descending the rear end of the hood (13), the push-up rod (52) can be reliably slidedly contacted and moved relative to the first slide contact portion (34R).

In the configuration of claims 7 to 9, when the hood (13) is opened, the front end of the hood (13) may be detached from the vehicle main body (10H) and the front end of the hood (13) may be upwardly moved while rotating the hood (13), together with the hinge arm (32), about the vehicle main body (10H). If the push-up rod (52) presses the rear end of the hood

(13) upward at the time the vehicle (10) collides, the hinge deformed portion (33) of the hinge arm (32) is bent and the upper end of the hood (13) is permitted to move to the upper limit position. Further, when the collision body (90) is battered against the top surface of the hood (13), the hinge deformed portion (33) of the hinge arm (32) is deformed in a direction to restore the bending to the original state, and thus the impact energy is absorbed by the deformation, thereby mitigating the impact.

According to a configuration of claims 10 to 12, the reinforcement ribs (35A and 35B) in the hinge deformed portion (33) of the hinge arm (32) are split by the slit (37), and thus the bending position in the flat plate portion (34) of the hinge deformed portion (33) is stabilized.

According to a configuration of claims 13 and 14, a rear-side flat portion (34R) and an arm intermediate curved portion (32W) provided in the hinge deformed portion (33) of the hinge arm (32) are used as the first slide contact portion (34R) and the second slide contact portion (32W), and thus the number of components can be reduced. Further, during the time that the push-up rod (52) moves from the standby position to the actuating position, the distal end (52H) of the push-up rod (52) slidingly contacts and moves from the front-side flat portion (34F) to the rear-side flat portion (34R). Thus, even if the collision body (90) is battered against the top surface of the hood (13) in the middle of the rear end of the hood (13) being pushed up, the rear end of the hood (13) is smoothly transitioned from an ascending operation to a descending operation, and thereby the impact can be mitigated.

According to a configuration of claims 15 to 17, during the time that the push-up rod (52) moves from the standby position to the actuating position, the distal end (52H) of the push-up rod (52) slidingly contacts and moves from the ascending slide contact portion (34F) to the first slide contact portion (34R). Thus, even if the collision body (90) is battered against the top surface of the hood (13) in the middle of the rear end of the hood (13) being pushed up, the rear end of the hood (13) is smoothly transitioned from an ascending operation to a descending operation, and thereby the impact can be mitigated.

In the configuration of claims 18 to 20, the distal end (52H) of the push-up rod (52) is diverted to the load liberating portion (13X) during the time that the rear end of the hood (13) reaches the lower limit, and thus the push-up rod (52) is prevented from being broken. Therefore, the vehicle main body (10H) is prevented from being damaged by the broken push-up rod (52).

DETAILED DESCRIPTION OF THE INVENTION

Figure 1:
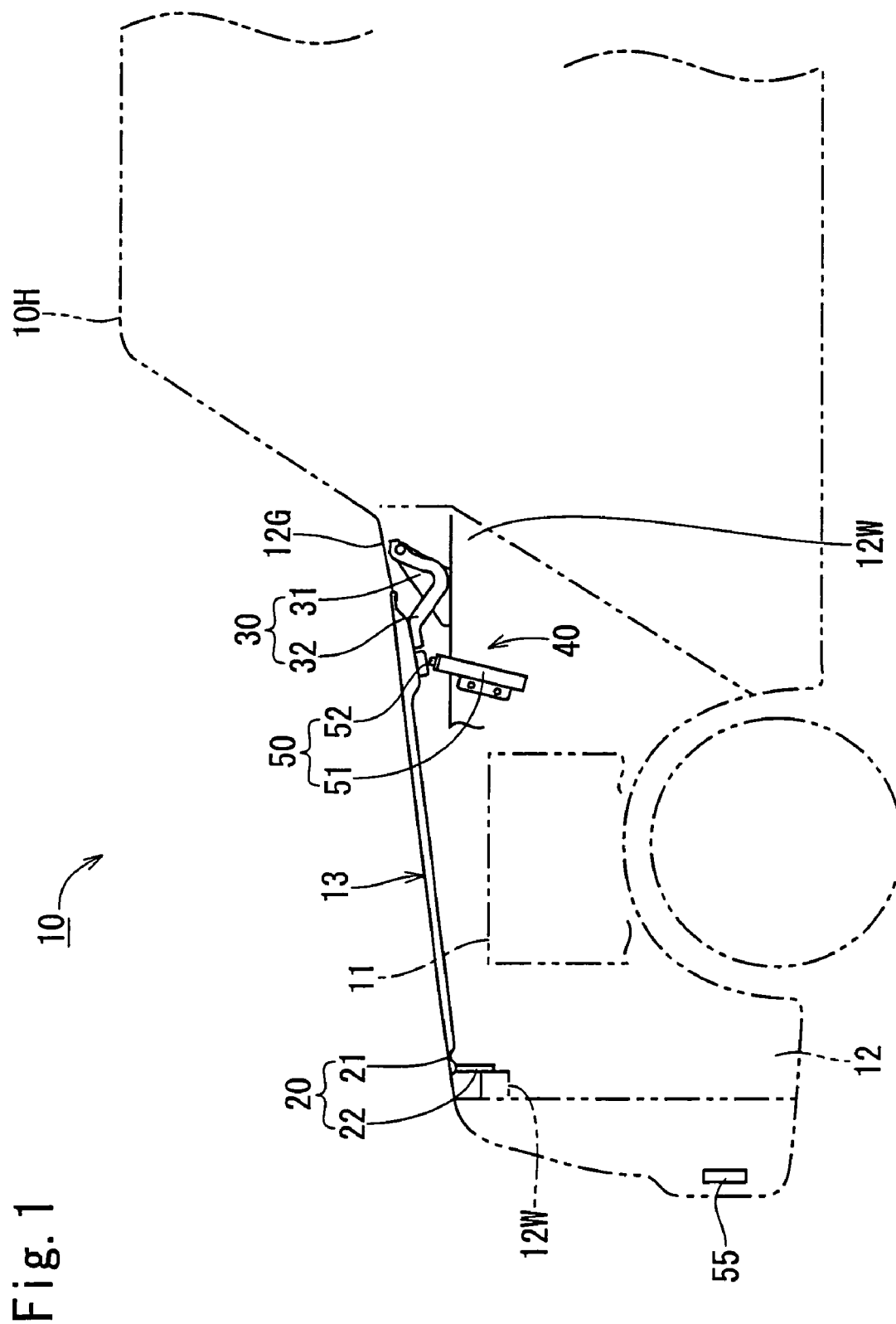
FIG. 1 is a conceptual diagram of a vehicle on which a hood impact absorbing apparatus according to a first embodiment of the present invention is mounted.

Hereinafter, a first embodiment of the present invention will be described based on FIG. 1 to FIG. 14. A vehicle 10 shown in FIG. 1 is provided with an engine room 12 accommodating an engine 11 at the front side. The top surface of the engine room 12 is closed by a hood 13.

Figure 4:
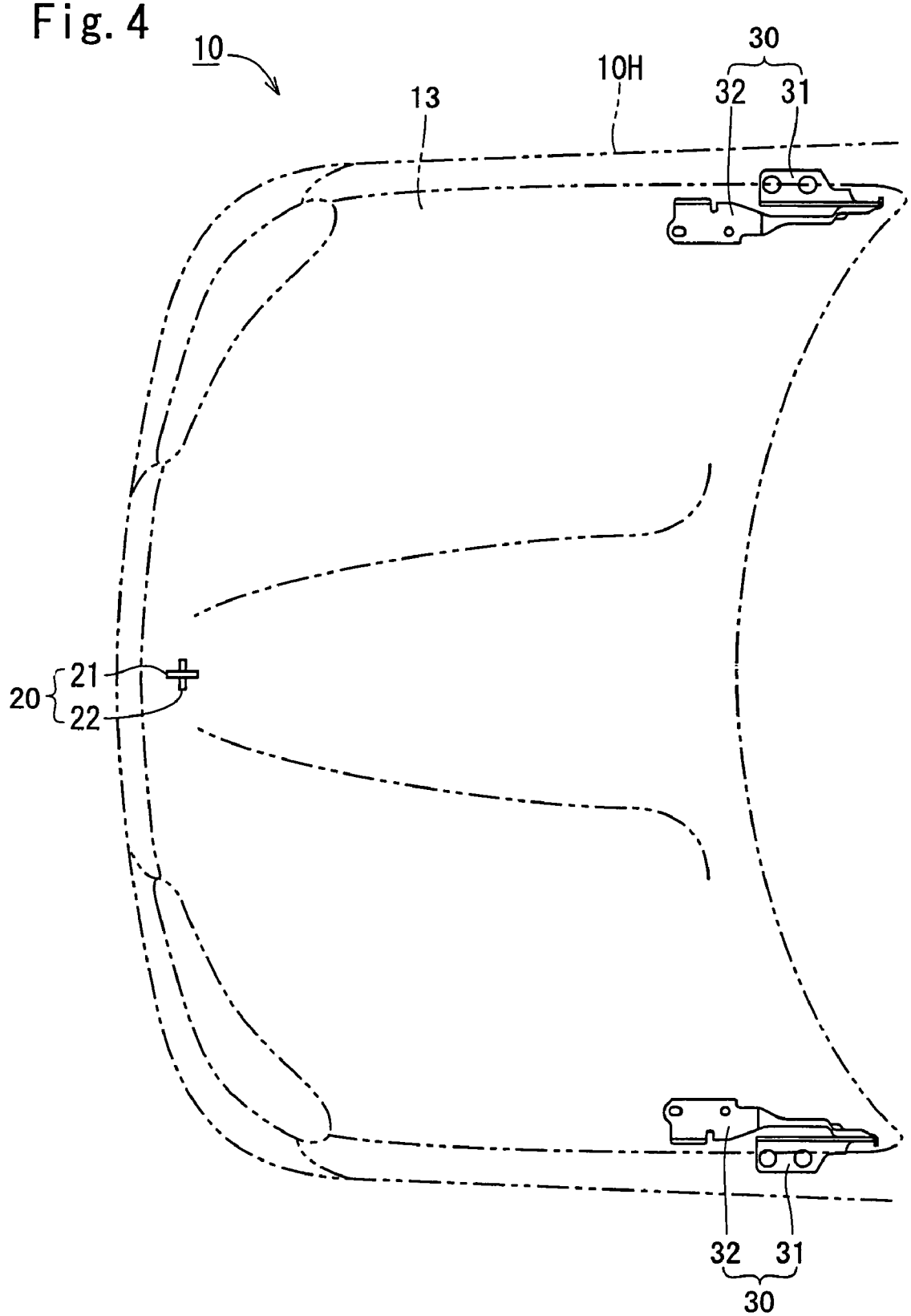
FIG. 4 is a plan view of a front-side portion of the vehicle.

The rear end of the hood 13 is joined to a vehicle main body 10H by a hinge mechanism 30 while the front end of the hood 13 is joined to the vehicle main body 10H by a lock mechanism 20. The lock mechanism 20 is placed at the center in a lateral direction of the hood 13, as shown in FIG. 4, and is composed of a striker 21 arranged on the undersurface in the front end of the hood 13 and a lock device 22 incorporated in an inner wall 12W in the front end of the engine room 12, as shown in FIG. 1. The striker 21 is shaped such that around rod is curved and deformed in a portal shape. The lock device 22 includes a latch (not shown) that moves rotationally to be meshed with the striker 21 and a ratchet (not shown) that regulates the rotational movement of the latch. Normally, in a state where the latch is engaged to be meshed with the striker 21, the rotational movement of the latch is regulated by the ratchet, and the front end of the hood 13 is held to the vehicle main body 10H. When an operation lever in the vehicle is operated, the regulation of rotational movement of the latch by the ratchet is deregulated, and as a result, the front end of the hood 13 becomes detachable upward from the vehicle main body 10H.

As shown in FIG. 4, a pair of hinge mechanisms 30 are placed on the both sides in the rear end of the hood 13. As shown in FIG. 1, each hinge mechanism 30 is provided with a support stand 31 fixed on the inner wall 12W of the engine room 12 and a hinge arm 32 joined rotationally movably to the support stand 31. It is noted that both the support stand 31 and the hinge arm 32 are molded products of a sheet metal.

Figure 8:
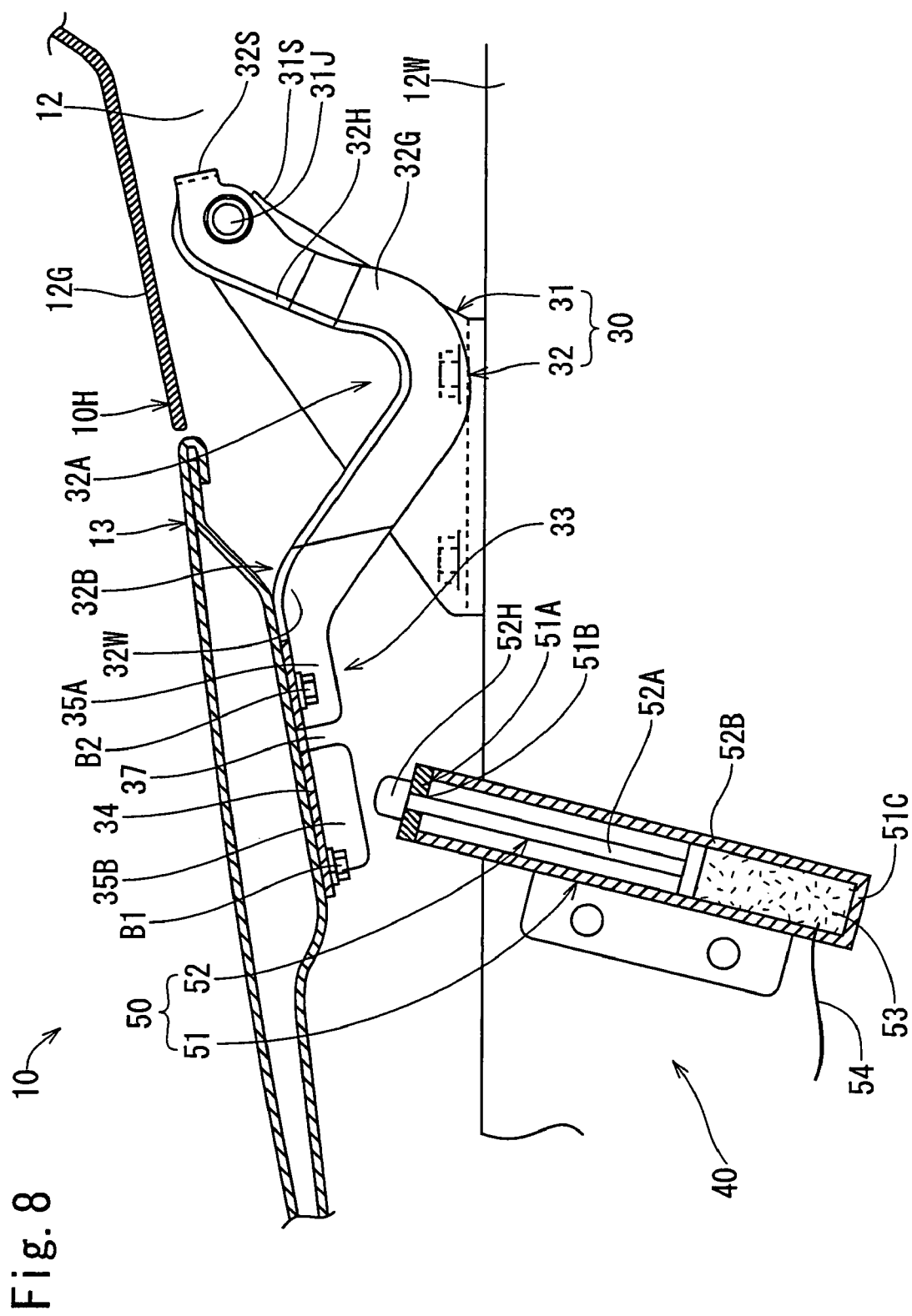
FIG. 8 is a sectional side view of an actuator.

As shown in FIG. 8, the support stand 31 is fixed by a bolt on the top surface of the inner wall 12W of the engine room 12. The support stand 31 is positioned below a vehicle outer wall 12G at the back of the hood 13 in the vehicle main body 10H. Further, at the upper end of the support stand 31, a spindle hole 31K (see FIG. 5) that penetrates through the vehicle 10 laterally is formed. The hinge arm 32 is joined rotatably to the support stand 31 by a rotation support shaft 31J penetrating through the spindle hole 31K.

Figure 2:
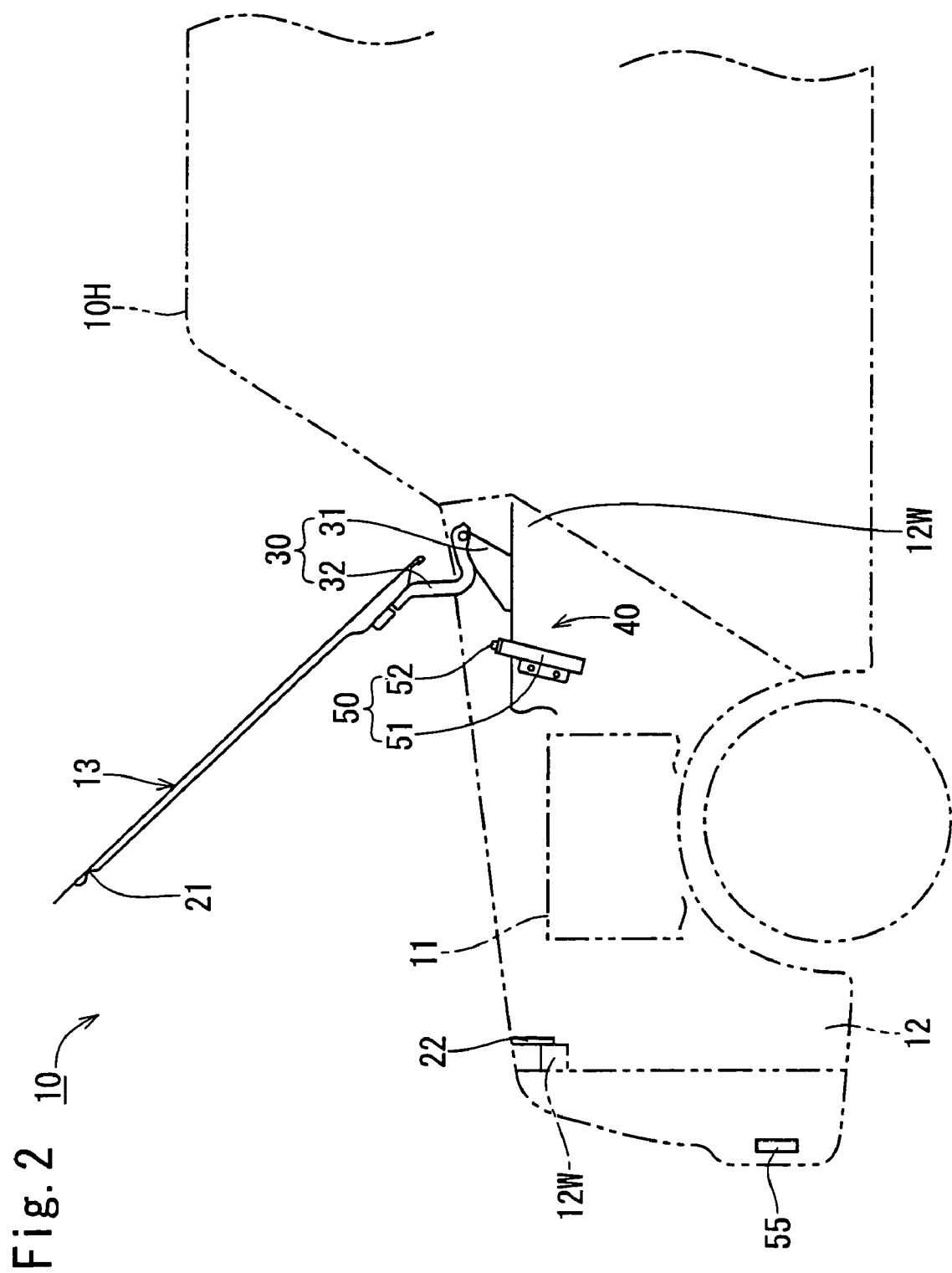
FIG. 2 is a conceptual diagram of a state where a hood of the vehicle is opened.
Figure 9:
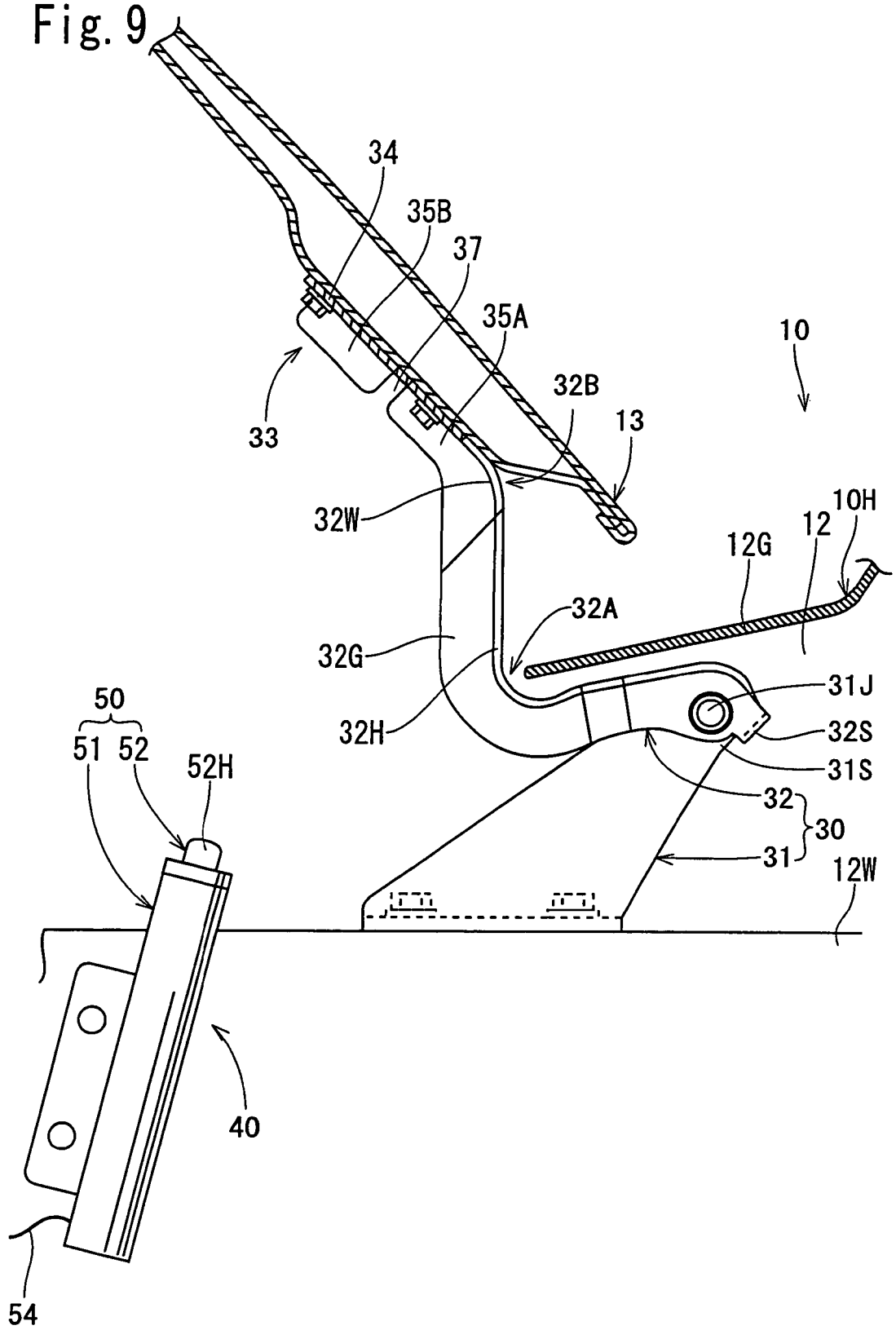
FIG. 9 is a side view of the hood impact absorbing apparatus of a state where the hood is opened.

The shape of the hinge arm 32 will be described below, based on a state where the hood 13 is closed as shown in FIG. 8. The hinge arm 32 extends forward and obliquely downward from a joining portion with the support stand 31, and thereafter is folded into a V shape and extends forward and obliquely upward. The upper end thereof is further folded obliquely downward, and extends in parallel with the undersurface of the hood 13. In the hinge arm 32, a portion that extends in parallel with the undersurface of the hood 13 is a hinge deformed portion 33 according to the present invention, and the hinge deformed portion 33 is fixed by bolts B1 and B2 on the undersurface in the rear end of the hood 13. When the front end of the hood 13 is upwardly moved by canceling the engagement between the striker 21 and the lock device 22 of the lock mechanism 20 (see FIG. 1), the hood 13 moves rotationally about the rotation support shaft 31J, integral with the hinge arm 32, as shown in FIG. 9. As a result, a top surface opening of the engine room 12 is opened, as shown in FIG. 2. When the hood 13 is moved rotationally to the end of the opened side, as shown in FIG. 9, the vehicle outer wall 12G is received in the inner side of the V-shaped bent portion in the hinge arm 32, and thereby, the rear end of the hood 13 is positioned above the vehicle outer wall 12G. Thus, since an elbow bent portion 32A is arranged in the hinge arm 32, the rotational movement range of the hinge arm 32 is widely secured. It is noted that out of the hinge arm 32, the V-shaped bent portion is referred to as an "elbow bent portion 32A" and a bent portion closer to the hinge deformed portion 33 is referred to as a "wrist bent portion 32B," below.

Figure 5:
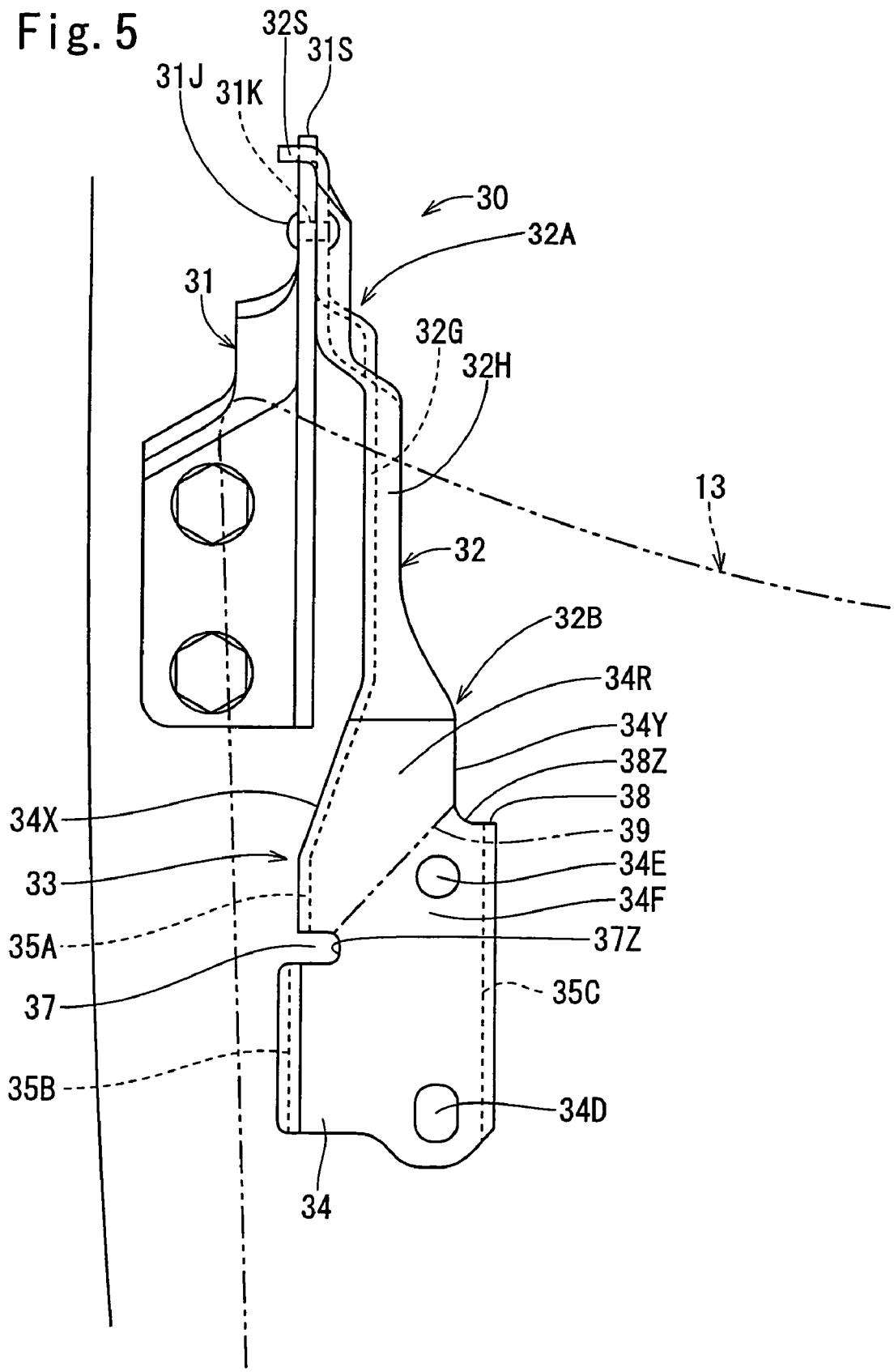
FIG. 5 is a plan view of a hinge mechanism.

In the hinge arm 32, an entire portion except for the hinge deformed portion 33 is in an L-shaped structure in cross section. More specifically, the hinge arm 32 is configured by an arm vertical wall 32G through which the rotation support shaft 31J penetrates and an arm lateral wall 32H protruding from the upper edge of the arm vertical wall 32G toward the center side in the lateral direction of the vehicle 10 (see FIG. 9). As shown in FIG. 5, a stopper wall 32S is provided in the proximal end of the hinge arm 32. The stopper wall 32S is formed such that a protrusion piece protruded from the edge of the arm vertical wall 32G is bent at a right angle to the support stand 31 side. As shown in FIG. 9, when the hood 13 is positioned at an open end in the movable range, the stopper wall 32S abuts against a waiting wall 31S provided in the support stand 31 and then is positioned.

As shown in FIG. 5, when the hinge arm 32 is seen from above, an area from the rear end to the intermediate portion in the hinge arm 32 is bent in a crank, and is spaced apart from the support stand 31 to the center side in the width direction of the vehicle 10. In the wrist bent portion 32B of the hinge arm 32, the lateral width of the arm lateral wall 32H is gradually widened toward the hinge deformed portion 33.

Figure 7A:
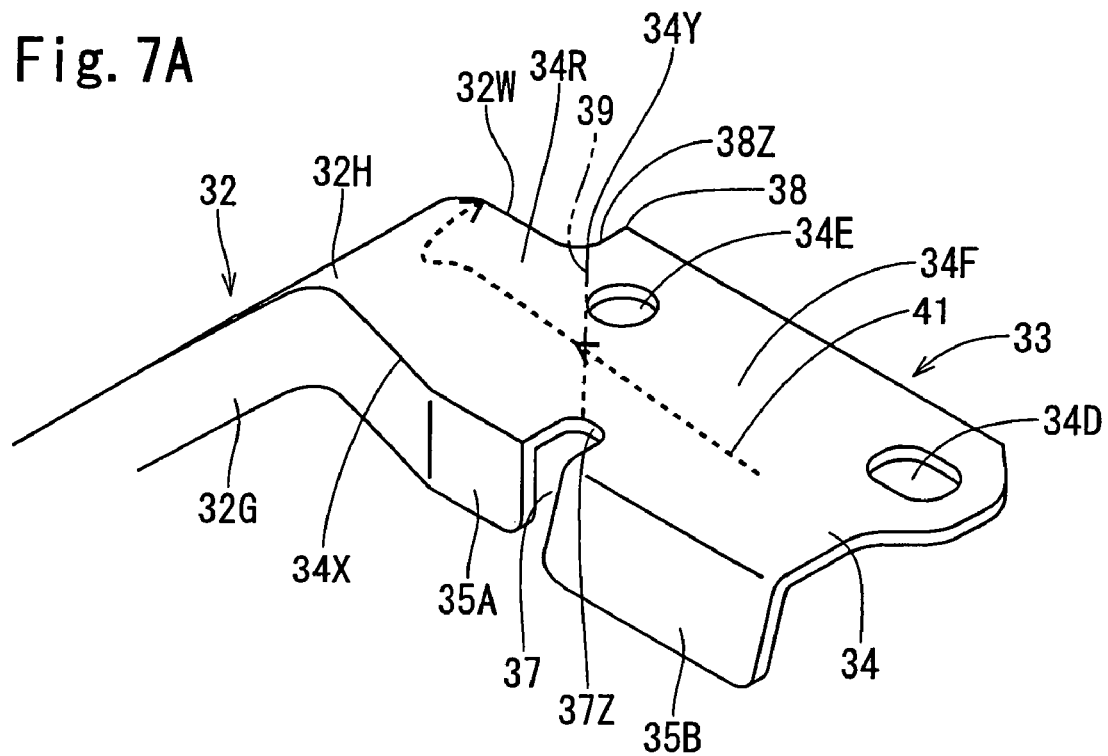
FIG. 7A is a perspective view in which a hinge deformed portion of the hinge arm is seen from above.

As shown in FIG. 7A, the hinge deformed portion 33 has a flat plate portion 34 that is continued to the arm lateral wall 32H and that is flat. The flat plate portion 34 gradually widens its width toward the intermediate portion from the rear end in the back-and-forth direction, and has an uniform width from the intermediate portion to the front end. More specifically, as shown in FIG. 5, an outer edge 34X positioned on the outside in the lateral direction of the flat plate portion 34 extends from the wrist bent portion 32B obliquely forward and outward, and an inner edge 34Y positioned on the inside in the lateral direction of the flat plate portion 34 extends in parallel with the back-and-forth direction from the wrist bent portion 32B. The inner edge 34Y has a middle portion that is bent in a crank to a side which is apart from the outer edge 34X. The outer edge 34X extends obliquely outward more forward than the crank bent portion 38 in the inner edge 34Y, is bent inward in the middle, and then extends in parallel with the back-and-forth direction.

In the outer edge 34X of the flat plate portion 34, a slit 37 is formed at an intermediate position in a portion extending in the back-and-forth direction, and an innermost surface 37Z of the slit 37 is rounded. In the crank bent portion 38 of the inner edge 34Y, a corner inner surface 38Z closer to the outer edge 34X is also rounded. With the boundary running along an imaginary folding straight line 39 linking the back surface 37Z of the slit 37 and the corner inner surface 38Z of the crank bent portion 38, a portion more forward than the folding straight line 39 in the flat plate portion 34 is a front-side flat portion 34F (corresponding to an "ascending slide contact portion" according to the present invention) while a portion more rearward than the folding straight line 39 is a rear-side flat portion 34R (corresponding to a "first slide contact portion" of the present invention). When the rear end of the hood 13 is pushed up by an actuator 50 described later, the rear-side flat portion 34R is folded downward with respect to the front-side flat portion 34F, as shown in a change from FIG. 7A to FIG. 7B.

In the front-side flat portion 34F, attaching holes 34D and 34E are arranged one behind the other at a position closer to the inner edge 34Y. The front-side attaching hole 34D is of a long-hole shape. In the front edge of the flat plate portion 34, a portion corresponding to the attaching hole 34D is projected. The bolts B1 and B2 (see FIG. 6) inserted into these attaching holes 34D and 34E are screwed on the undersurface of the hood 13, and thereby, the hinge deformed portion 33 is fixed to the rear end of the hood 13. When the hood 13 is closed, the flat plate portion 34 is inclined so that the rear is slightly raised to the horizontal direction.

Figure 6:
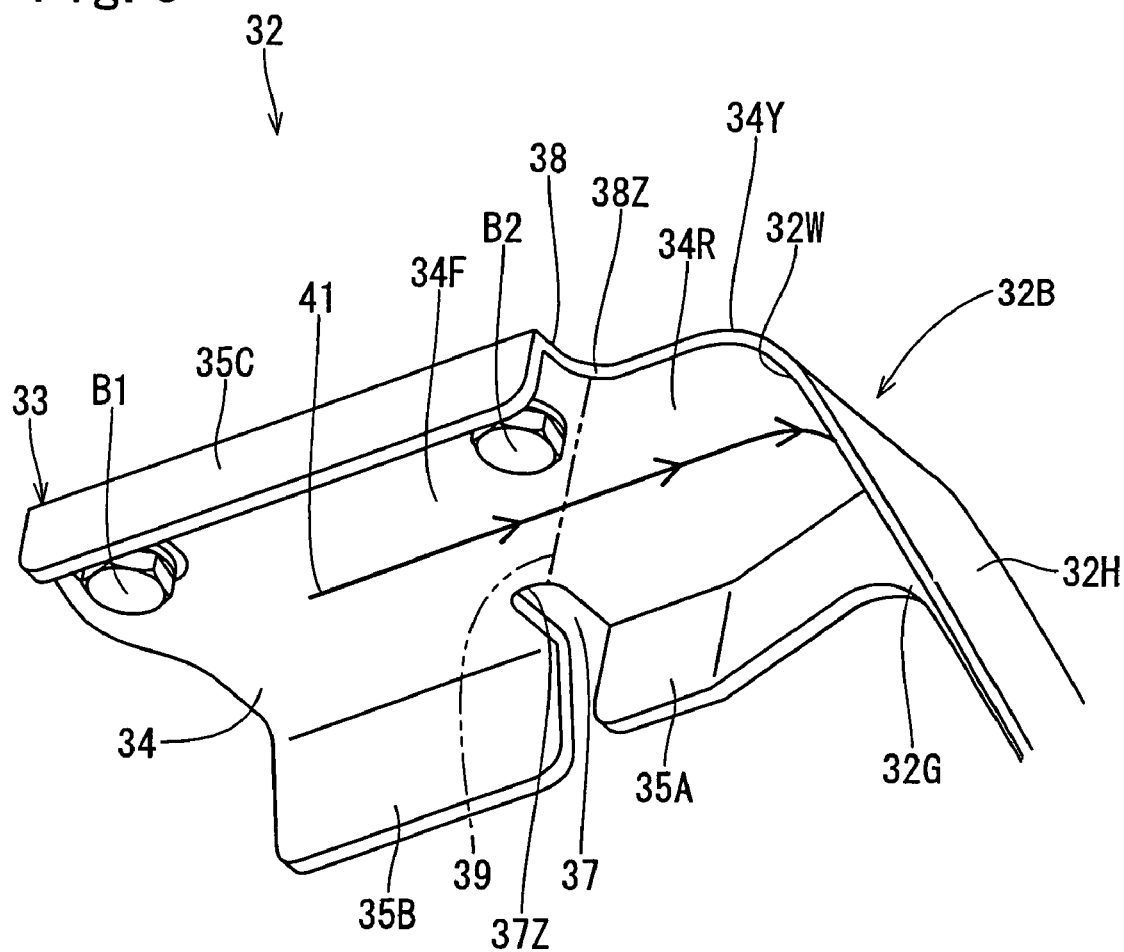
FIG. 6 is a perspective view in which a front-end portion of a hinge arm is seen from below.
Figure 7B:
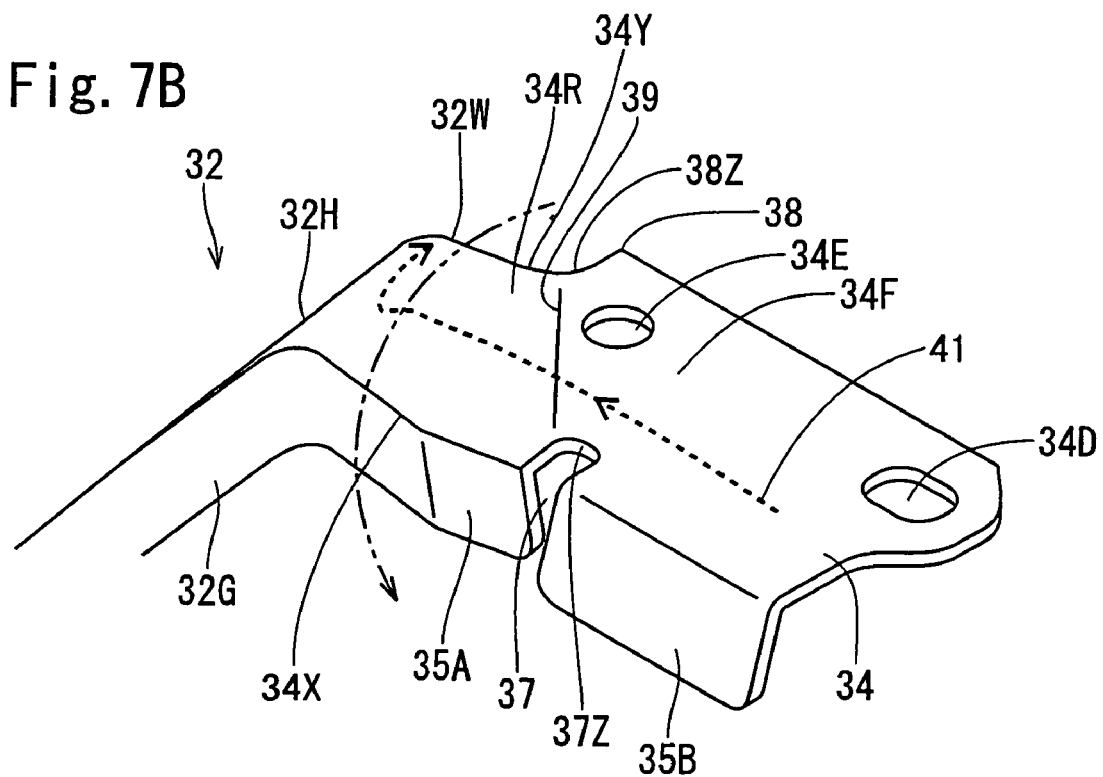
FIG. 7B is a perspective view in which the hinge deformed portion is seen from above.

As shown in FIG. 7A, from the outer edge 34X that is rearward of the slit 37 in the flat plate portion 34, a first reinforcement rib 35A that continues to the arm vertical wall 32G is projected vertically downward. From the outer edge 34X that is forward of the slit 37 in the flat plate portion 34, a second reinforcement rib 35B is projected obliquely outward. When the rear-side flat portion 34R of the flat plate portion 34 is bent with respect to the front-side flat portion 34F, the first reinforcement rib 35A enters the inside of the second reinforcement rib 35B, and as a result, the interference between the ribs 35A and 35B is avoided, as shown in FIG. 7B. Further, as shown in FIG. 6, in the inner edge 34Y in the flat plate portion 34, a third reinforcement rib 35C is projected vertically downward only from a portion that is forward of the crank bent portion 38. It is noted that a projection amount of the third reinforcement rib 35C is smaller than those of the first reinforcement rib 35A and the second reinforcement rib 35B.

As shown in FIG. 6, the arm lateral wall 32H in the wrist bent portion 32B is curved obliquely rearward and downward while drawing a gradual arch from the rear-side flat portion 34R in the flat plate portion 34 of the hinge deformed portion 33, and is an arm intermediate curved portion 32W according to the present invention (corresponding to a "second slide contact portion" according to the present invention). It is noted that an angle formed between the flat plate portion 34 and a straight line portion between the wrist bent portion 32B and the elbow bent portion 32A in the arm lateral wall 32H is opened at approximately 120 degrees (see FIG. 8).

As shown in FIG. 8, on the side surface of the inner wall 12W whose top surface is fixed with the support stand 31) in the engine room 12, an actuator 50 is attached. By this actuator 50 and the aforementioned hinge arm 32, a hood impact absorbing apparatus 40 of the present invention is configured. The actuator 50 is configured such that a push-up rod 52 is incorporated movably on a cylinder 51, for example. The cylinder 51 has a cylindrical shape with a bottom on each end, and extends in a slightly inclined direction with respect to its up-and-down direction, for example. More specifically, the cylinder 51 is fixed to the side surface of the inner wall 12W (in the engine room 12) whose top surface is fixed with the support stand 31, in an inclined state where the upper end is positioned rearward of the lower end. On an upper end wall 51A of the cylinder 51, a through-hole 51B is formed, through which the push-up rod 52 penetrates.

The push-up rod 52 is provided with a circular plate body 52B at the lower end of a main body 52A that penetrates the through-hole 51B. The circular plate body 52B is approximately the same in diameter as the cylinder 51, and acts directly within the cylinder 51. At the upper end of the main body 52A, a head portion 52H (corresponding to a "distal end" according to the present invention) is provided. The head portion 52H is of a columnar shape whose outer diameter is larger than that of the main body 52A, and the upper end surface thereof is rounded and swells upward.

Figure 3:
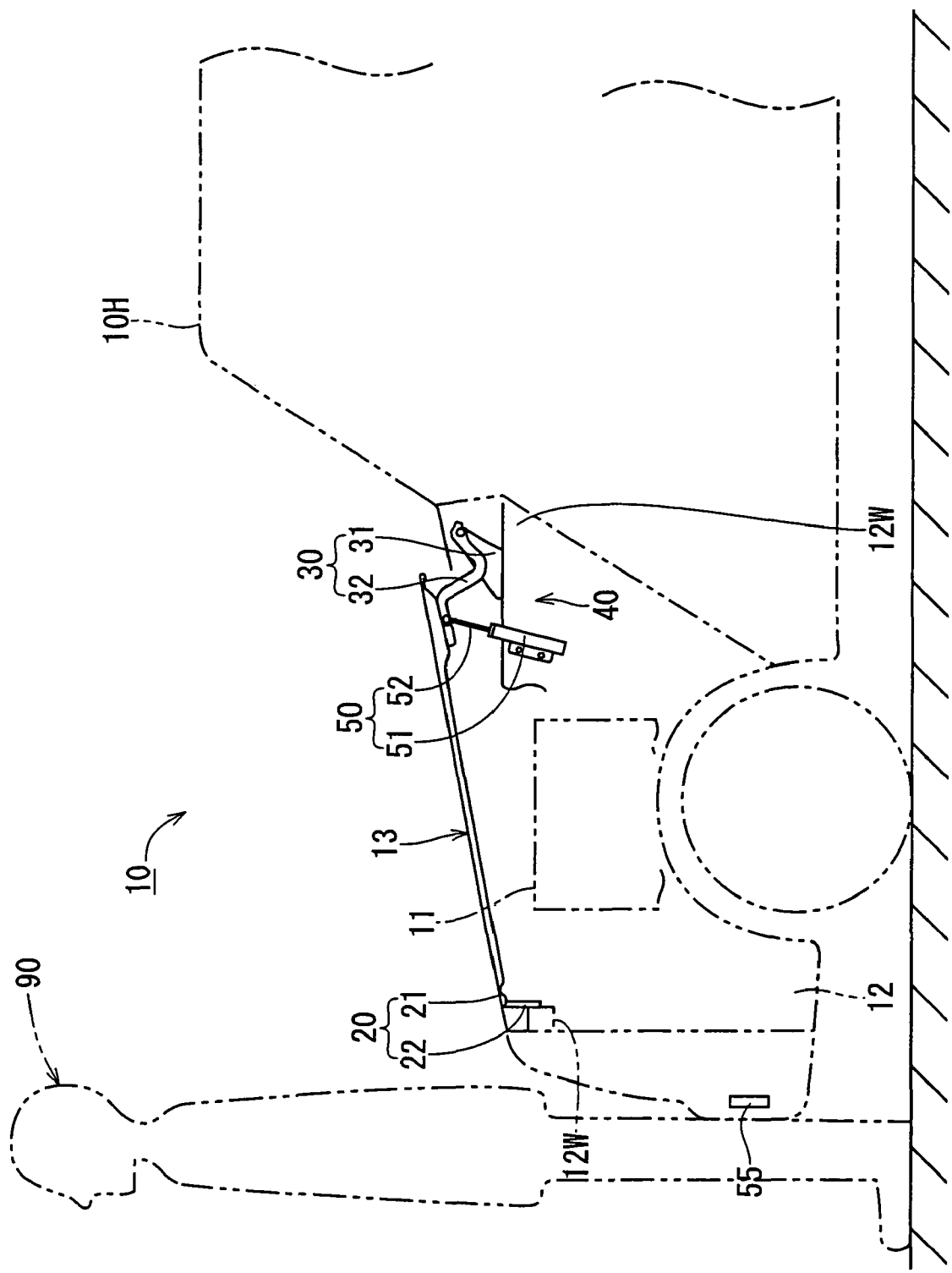
FIG. 3 is a conceptual diagram of a state where the vehicle collides with a pedestrian.

In the push-up rod 52, the undersurface of the head portion 52H normally abuts against the top surface of the upper end wall 51A in the cylinder 51, and the push-up rod 52 is positioned at a "standby position" separated downward from the rear end of the hood 13. In a state where the push-up rod 52 is positioned at the standby position, the circular plate body 52B of the push-up rod 52 is placed at a position closer to the lower end of the cylinder 51, and a gas generating agent 53 is filled between the circular plate body 52B and the lower end wall 51C of the cylinder 51. To the lower end of the cylinder 51, an ignition wire 54 for igniting the gas generating agent 53 is drawn in from outside. Further, as shown in FIG. 3, on the front surface of the vehicle 10, an impact detection sensor 55 is arranged. When a pedestrian 90 (corresponding to a "collision body" according to the present invention), for example, collides with the front surface of the vehicle 10, the impact is detected by the impact detection sensor 55, and the ignition wire 54 is energized, thereby firing the gas generating agent 53. Then, the gas generating agent 53 explodes and is vaporized at once, and the push-up rod 52 is pushed up to an "actuating position" at which the circular plate body 52B abuts against the undersurface of the upper end wall 51A in the cylinder 51. At this time, by the guidance of the cylinder 51, the push-up rod 52 ascends rearward and obliquely upward from the standby position and reaches the actuating position. The push-up rod 52 is held at the actuating position by a gas pressure within the cylinder 51.

The configuration of the hood impact absorbing apparatus 40 of the first embodiment has been described above. Subsequently, the operation and the effects of the hood impact absorbing apparatus 40 will be described. The hood 13 is opened when performing maintenance work for the engine 11, etc. In order to open the hood 13, an operation lever (not shown) in the vehicle is operated to cancel the engagement between the striker 21 and the lock device 22 of the lock mechanism 20 (see FIG. 1). Subsequently, the hood 13 may be moved rotationally in such a manner as upwardly moving the front end of the hood 13.

Figure 11:
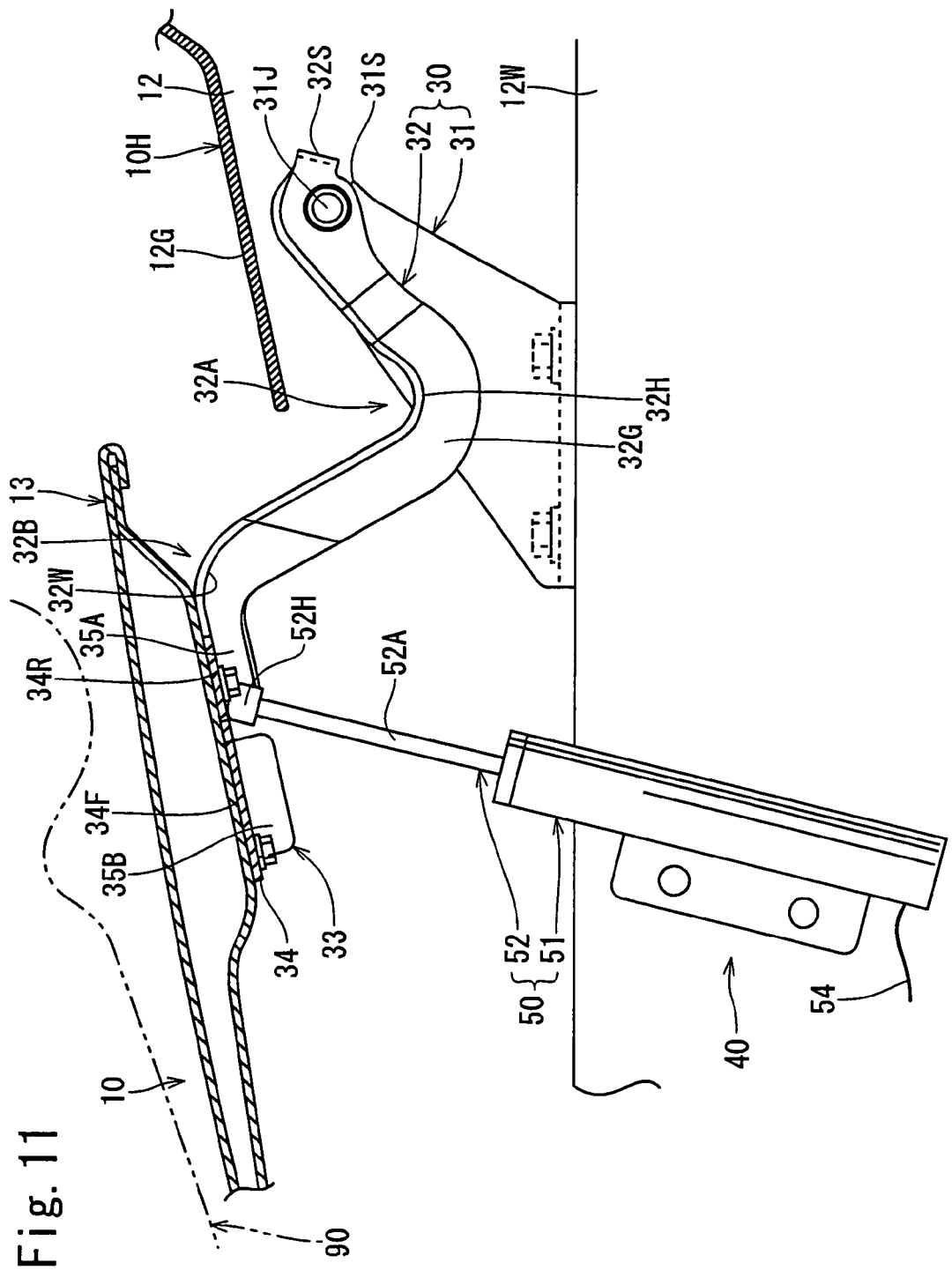
FIG. 11 is a side view of a state where the push-up rod pushes up the hood.
Figure 13:
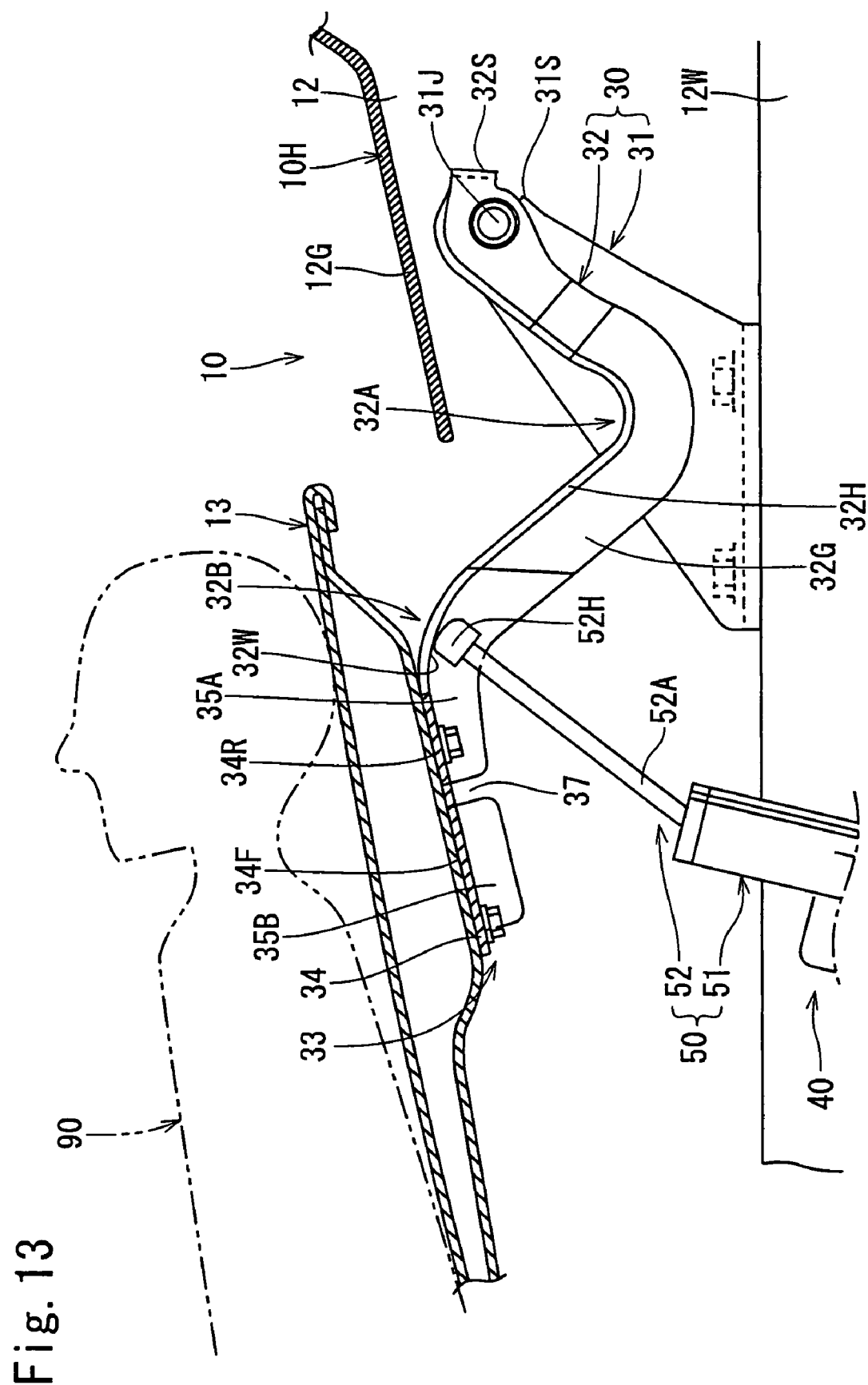
FIG. 13 is a side view of a state where the push-up rod is folded by the hood.
Figure 14:
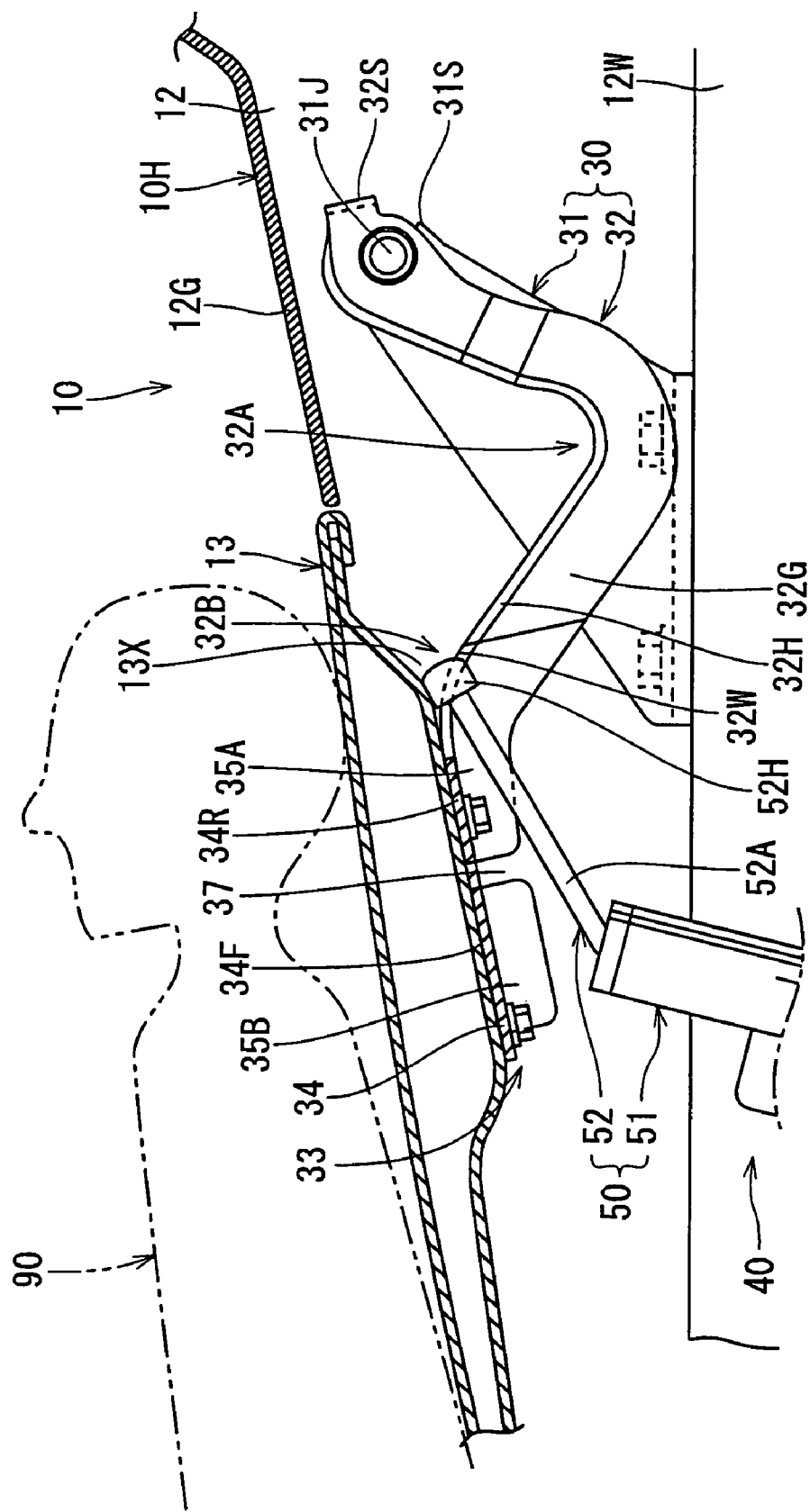
FIG. 14 is a side view of a state where the push-up rod diverts to a lateral side of the hinge arm.

Also during a driving time, the striker 21 is normally engaged with the lock device 22 and the hood 13 is closed. With this state, the hood 13 is in a state where the rear is slightly raised (see FIG. 1). As shown in FIG. 3, if the vehicle 10 hits for example the pedestrian 90 while driving the pedestrian 90 is often battered against the top surface of the hood 13, as shown in FIG. 11 and FIG. 13, after colliding with the front surface of the vehicle 10. In contrast thereto, in the vehicle 10 provided with the hood impact absorbing apparatus 40 of the first embodiment, when the pedestrian 90 collides with the front surface of the vehicle 10, as shown in FIG. 3, the collision is detected by the impact detection sensor 55, and the gas generating agent 53 (see FIG. 8) within the cylinder 51 is fired. As a result, the gas generating agent 53 is vaporized all at once and the push-up rod 52 ascends from the standby position to the actuating position all at once, and by the push-up rod 52, the rear end of the hood 13 is pushed up to the upper limit position.

Figure 10:
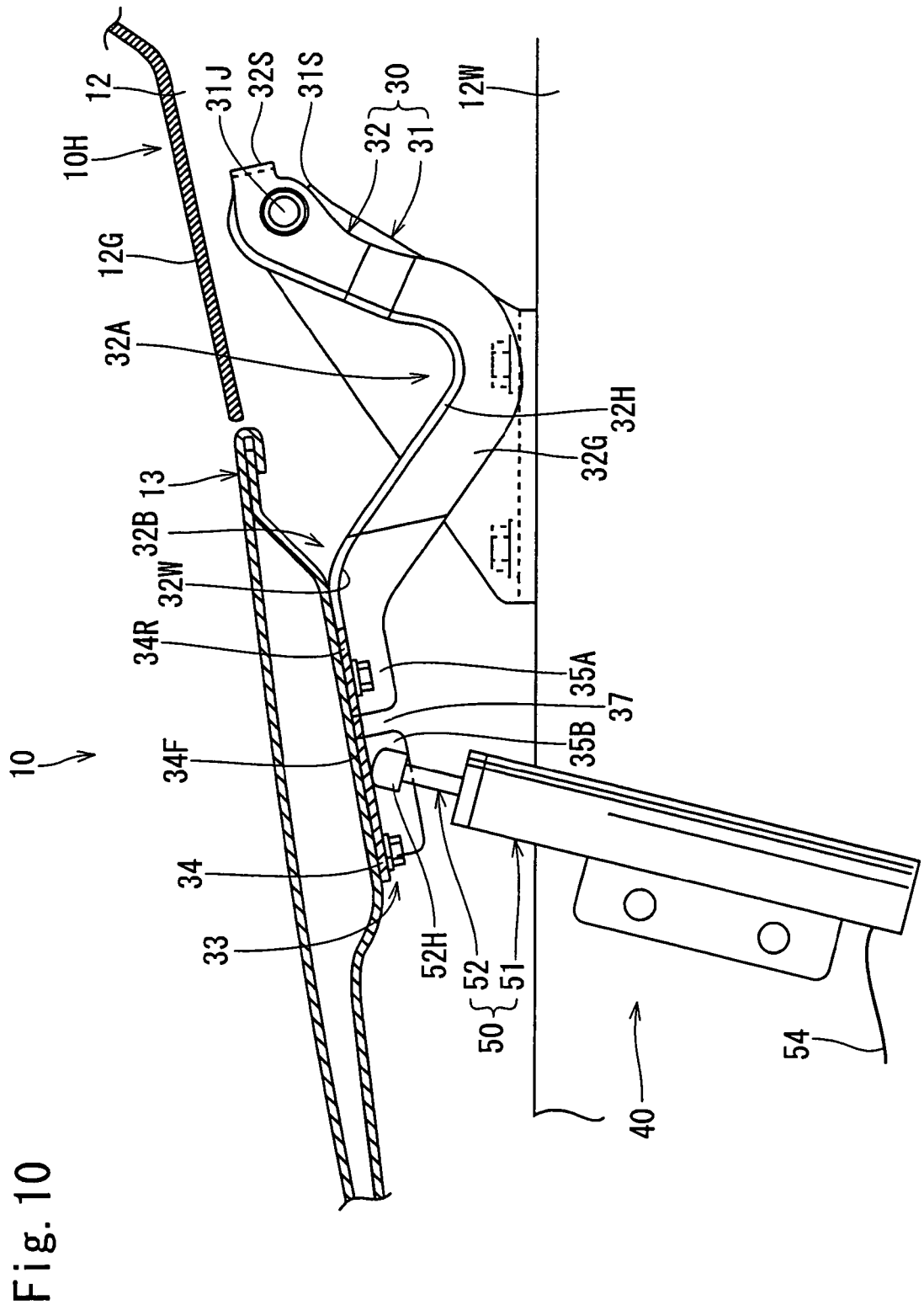
FIG. 10 is a side view of a state where a push-up rod abuts against a hood.

More specifically, while the push-up rod 52 is on the way to reaching from the standby position to the actuating position, the head portion 52H of the push-up rod 52 first abuts against the front-side flat portion 34F in the flat plate portion 34 of the hinge arm 32 fixed to the rear end of the hood 13 (see FIG. 10). At this time, the head portion 52H of the push-up rod 52 abuts from a forward and oblique direction relative to the undersurface of the front-side flat portion 34F, and thereafter pushes up the rear end of the hood 13 while slidingly contacting and moving along the front-side flat portion 34F. By the pushing-up force, the flat plate portion 34 is folded at the folding straight line 39 as shown in FIG. 7B, and as a result, the rear-side flat portion 34R is in a state of being bent obliquely downward relative to the front-side flat portion 34F. Subsequently, as shown in FIG. 11, when the push-up rod 52 has reached the actuating position, the head portion 52H of the push-up rod 52 is placed at the rear-side flat portion 34R. In this way, before the pedestrian 90 is battered against the hood 13, the hood 13 is held in a state where a rearward-raised inclination angle is increased at the front end serving as a supporting point (see FIG. 3 and FIG. 11).

In this state, when the pedestrian 90 is battered against the top surface of the hood 13, while decreasing the rearward-raised inclination angle of the hood 13, the rear end of the hood 13 descends from the upper limit position, the head portion 52H of the push-up rod 52 is slidedly contacted and moved rearward along the rear-side flat portion 34R, and the proximal end of the push-up rod 52 is folded (see FIG. 13). Thus, during a process of descending the rear end of the hood 13, the push-up rod 52 is gradually folded, and therefore, as compared to the conventional art, a deforming amount of the push-up rod 52 is larger, and thus the collision speed of the pedestrian 90 can be gradually decelerated. At this time, the impact energy is not only absorbed by the bending deformation of the push-up rod 52 but also the head portion 52H of the push-up rod 52 moves while receiving friction from the rear-side flat portion 34R. Thus, the impact energy is absorbed by the frictional movement (i.e., slide contact movement) as well. In addition thereto, the hinge deformed portion 33 of the hinge arm 32 is deformed in such a direction that the bending between the front-side flat portion 34F and the rear-side flat portion 34R is restored to the original state, and thus also by this deformation, the impact energy is absorbed, thereby mitigating the impact.

The head portion 52H of the push-up rod 52 passes through the rear-side flat portion 34R, and thereafter, reaches the arm intermediate curved portion 32W in the hinge arm 32. The arm intermediate curved portion 32W receives the head portion 52H of the push-up rod 52 in a slide contact movement direction in the terminal end of the rear-side flat portion 34R, and guides the head portion 52H of the push-up rod 52 to a lateral direction relative to the slide contact movement direction in the terminal end of the rear-side flat portion 34R (see FIG. 7A).

Figure 12:
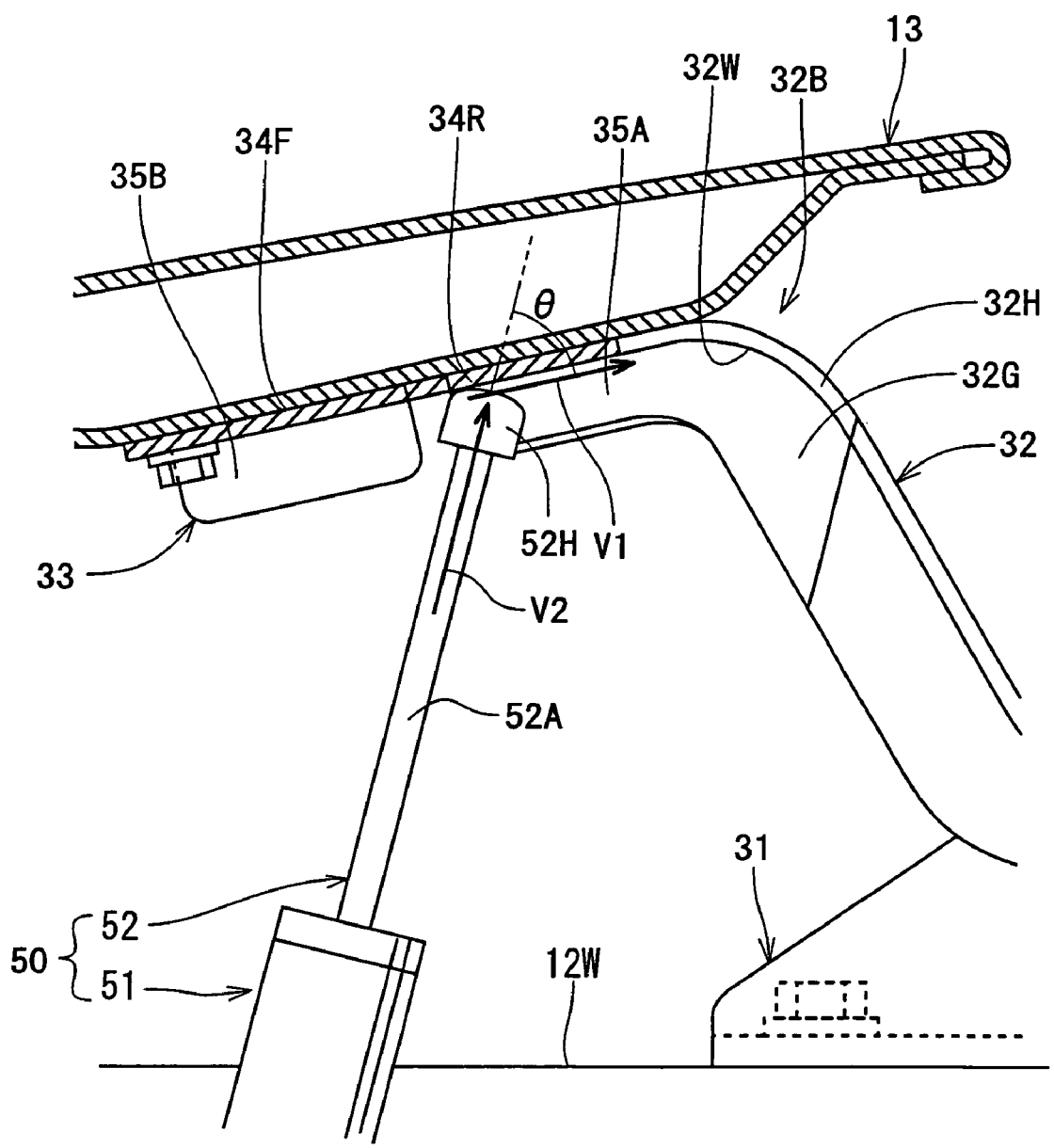
FIG. 12 is a side view of a state where the push-up rod pushes up the hood.

Herein, in the rear-side flat portion 34R, as shown in FIG. 12, a slide contact angle $\theta$ that is an angle formed between a first vector V1 oriented to a slide contact movement direction of the head portion 52H of the push-up rod 52 and a second vector V2 oriented from the proximal end of the push-up rod 52 to the head portion 52H is decreased as the slide contact movement is advanced. Further, the arm intermediate curved portion 32W has a larger slide contact angle θ as compared to the terminal end of the rear-side flat portion 34R. When the slide contact angle θ becomes larger, the pushing force of the head portion 52H of the push-up rod 52 also becomes larger and so does the friction force. Therefore, when the head portion 52H of the push-up rod 52 advances along the arm intermediate curved portion 32W in the backward direction that is the same direction as the slide contact movement direction in the terminal end of the rear-side flat portion 34R, the slide contact angle θ is increased. Finally, the head portion 52H cannot move in the backward direction any more, is oriented to the lateral direction, and slidingly contacts and moves along the arm intermediate curved portion 32W. At this time, the arm intermediate curved portion 32W is inclined so that its side opposite to the arm vertical wall 32G is positioned slightly upward by the bending of the flat plate portion 34 as shown in FIG. 7B, and thus the head portion 52H of the push-up rod 52 moves in a direction away from the arm vertical wall 32G. The slide contact angle θ that is formed when the head portion 52H of the push-up rod 52 has begun the slide contact movement in the lateral direction by the arm intermediate curved portion 32W is larger than the slide contact angle θ of the terminal end of the rear-side flat portion 34R, and the slide contact angle θ also is gradually smaller as the slide contact movement is advanced. Also while advancing along the arm intermediate curved portion 32W in the lateral direction, the impact energy is absorbed by the frictional movement (i.e., the slide contact movement).

Thus, in the hood impact absorbing apparatus 40 of the first embodiment, while the head portion 52H of the push-up rod 52 passes through the rear-side flat portion 34R and the arm intermediate curved portion 32W, there are at least two peaks of friction force. That is, during a process in which the rear end of the hood 13 descends, the peaks at which the absorbing amount of the impact energy becomes large can be provided at least twice. This makes it possible to avoid the pedestrian 90 from receiving a large impact at once from the hood 13, and thus the impact can be further mitigated than the conventional art. It is noted that in FIG. 6 and in FIG. 7, a route 41 of the head portion 52H of the push-up rod 52 slidingly contacting along the hinge arm 32 is shown.

The head portion 52H of the push-up rod 52 is departed from the arm lateral wall 32H by the guidance of the arm intermediate curved portion 32W and moves to a load liberating portion 13X (see FIG. 14) on the lateral side of the hinge arm 32, and the push-up rod 52 is not broken but liberated from the load involved in the descending of the hood 13. Accordingly, the hood 13 can descend without breaking the push-up rod 52, and thus the damage of the engine 11, etc., by the broken push-up rod 52 can be prevented.

Further, even when the pedestrian 90 is battered against the top surface of the hood 13 before the push-up rod 52 reaches the actuating position after it ascends from the standby position, the head portion 52H of the push-up rod 52 slidingly contacts and moves from the front-side flat portion 34F to the rear-side flat portion 34R, similar to the process in which the hood 13 descends. The rear end of the hood 13 is smoothly transitioned from an ascending operation to a descending operation, and thus the impact can be mitigated.

In addition, the push-up rod 52 ascends rearward and obliquely upward from the standby position, and thus even when the hood 13 is deformed by the collision, for example, the axial direction of the push-up rod 52 is in a reliably inclined state relative to the slide contact surface in the rear-side flat portion 34R. Thereby, at the time of descending the rear end of the hood 13, the push-up rod 52 can be reliably slidedly contacted and moved relative to the rear-side flat portion 34R.

In the hood impact absorbing apparatus 40 of the first embodiment, the rear-side flat portion 34R and the arm intermediate curved portion 32W provided in the hinge deformed portion 33 of the hinge arm 32 are utilized as a slide contact component for the push-up rod 52, and thus as compared to a case that the slide contact component is additionally arranged, the number of components can be reduced. Further, the first and second reinforcement ribs 35A and 35B in the hinge deformed portion 33 of the hinge arm 32 are split by the slit 37, and thus the bending position in the flat plate portion 34 of the hinge deformed portion 33 is stabilized.

It is noted that according to the configuration of the first embodiment, a change pattern of the slide contact angle θ of the route along which the head portion 52H of the push-up rod 52 slidingly contacts and moves is modified in various ways, whereby the impact absorbing pattern during the time that the rear end of the hood 13 descends from the upper limit position to the lower limit position can be set to a suitable pattern according to the various types of hoods 13 different in shape for each vehicle type.

Figure 15:
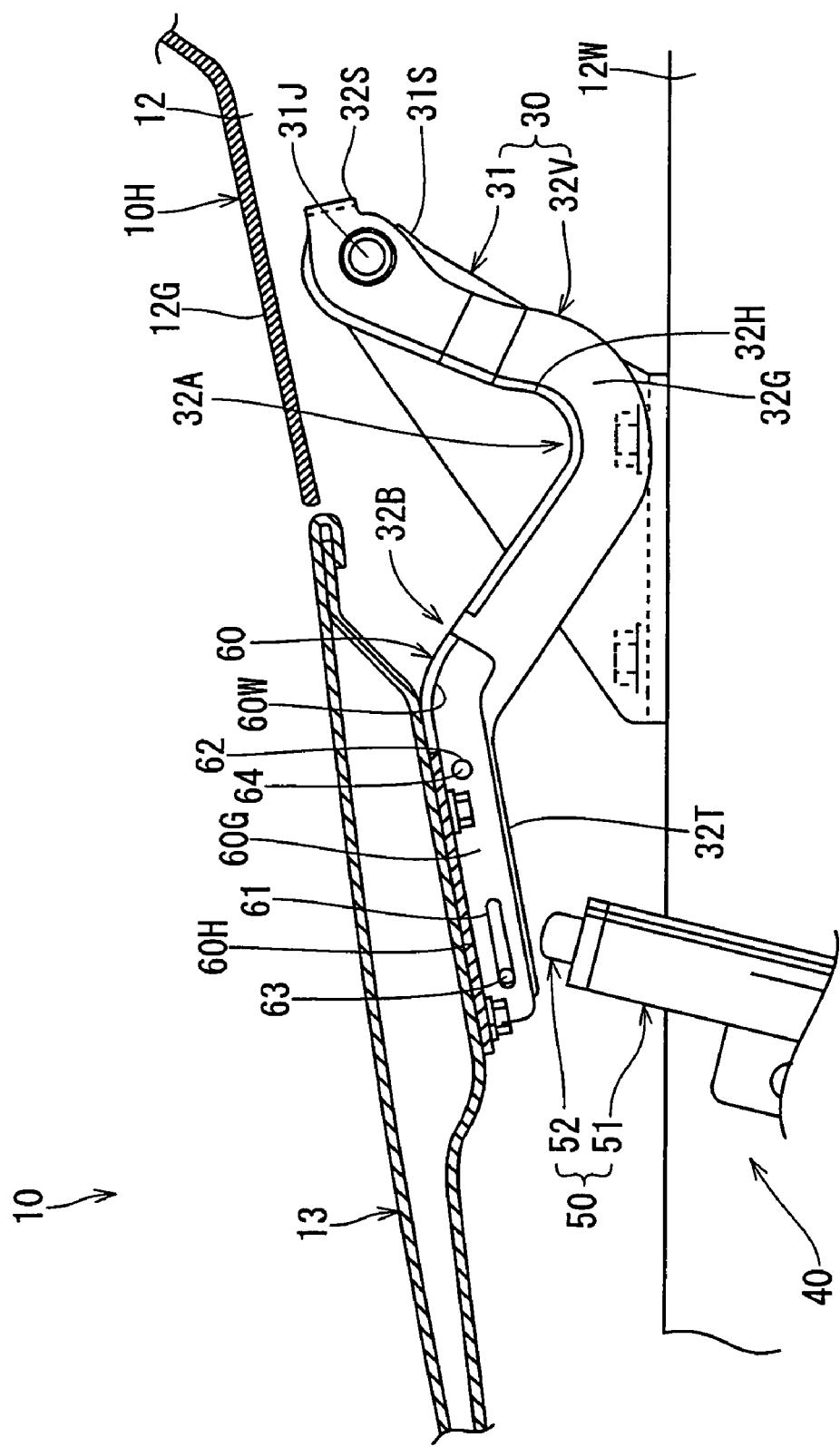
FIG. 15 is a side view of a hood impact absorbing apparatus of a second embodiment during a non-operating time.
Figure 16:
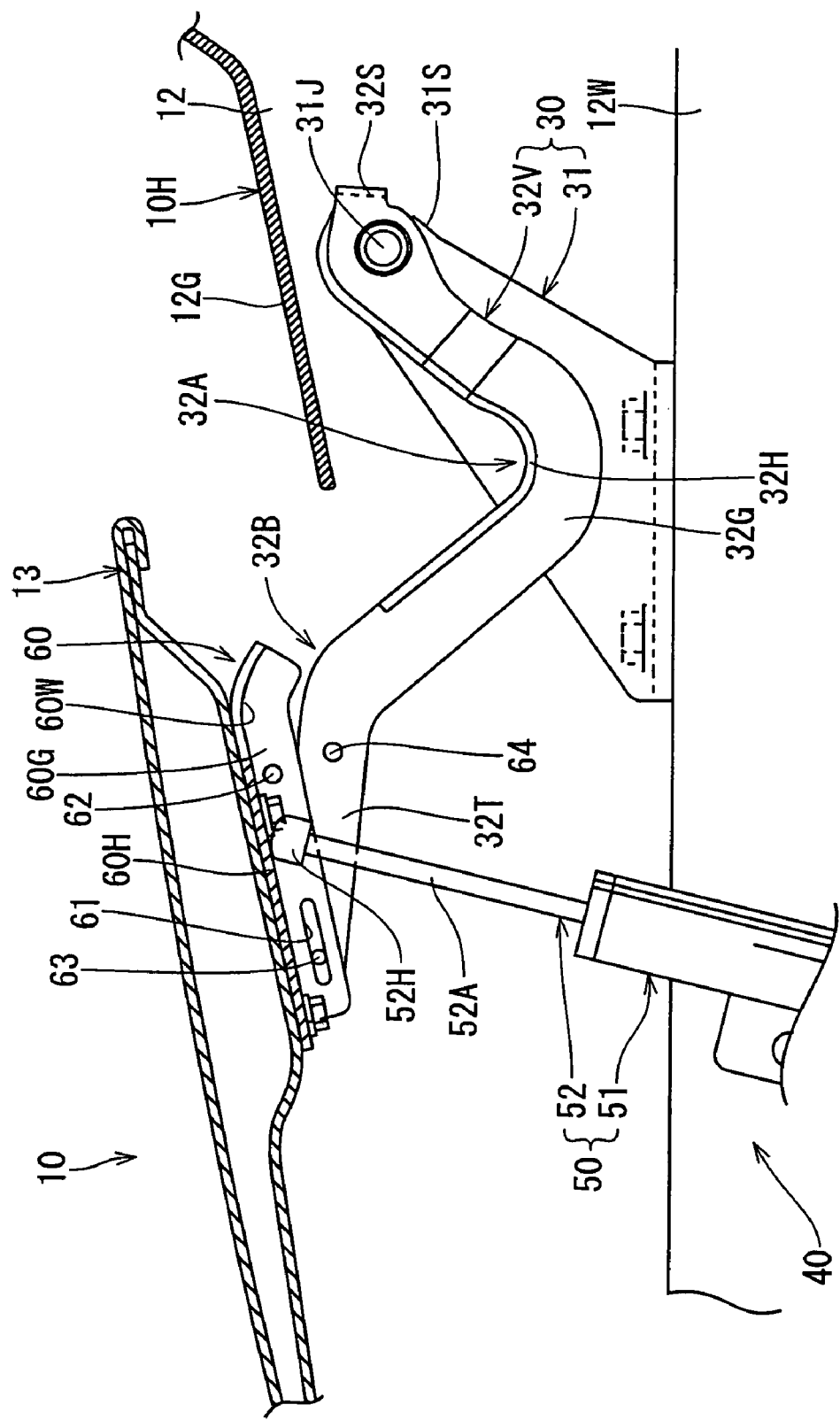
FIG. 16 is a side view of the hood impact absorbing apparatus during an operating time.

A second embodiment is shown in FIG. 15 and in FIG. 16, and differs mainly in configuration of a hinge arm 32V from the first embodiment. Hereinafter, only the configuration different from that of the first embodiment will be described. Parts of the same structure as those of the first embodiment are assigned the same reference numerals and letters, and overlapping description will be omitted.

In the hinge arm 32V of the second embodiment, the arm lateral wall 32H is discontinued between the elbow curved portion 32A and the wrist bent portion 32B, a portion forward of the wrist bent portion 32B is configured only by the arm vertical wall 32G and is a joint protrusion piece 32T that extends along the undersurface of the hood 13. The joint protrusion piece 32T is joined rotationally movably to a rod slide contact member 60 fixed on the undersurface of the hood 13. The rod slide contact member 60 is provided with a flat plate portion 60H overlaid and fixed on the undersurface of the hood 13, an arm intermediate curved portion 60W formed by downward warping the rear end of the flat plate portion 60H, and a joining rib 60G suspended from one side portion of the flat plate portion 60H and the arm intermediate curved portion 60W. A portion across the flat plate portion 60H and the arm intermediate curved portion 60W is the same in shape as the portion across the flat plate portion 34 and the arm intermediate curved portion 32W in the hinge arm 32 in the first embodiment.

The joining rib 60G of the rod slide contact member 60 is approximately the same in shape as the joint protrusion piece 32T. In the front end of the joining rib 60G, a long hole 61 extending in the back-and-forth direction is formed while in the rear end of the joining rib 60G, a round hole 62 is formed. With the long hole 61, a pin 63 protruded from the front end of the joint protrusion piece 32T is engaged in a falling-off preventive state. On the other hand, with the round hole 62, a knockout pin 64 protruded from the rear end of the joint protrusion piece 32T is fitted, as shown in FIG. 15. The configuration of the second embodiment has been described above.

According to this configuration, normally, the rod slide contact member 60 and the hinge arm 32V are fixed integrally, as shown in FIG. 15. At the time of canceling the engagement between the striker 21 (see FIG. 1) and the lock device 22 (see FIG. 1), the hood 13 and the hinge arm 32V are rotationally moved integrally. When the vehicle 10 collides, the push-up rod 52 slidingly contacts the flat plate portion 60H of the rod slide contact member 60 thereby to push up the rear end of the hood 13, as shown in FIG. 16. As a result, the knockout pin 64 is severed and the hinge arm 32V becomes rotationally movable with respect to the rod slide contact member 60, and thereby, the rear end of the hood 13 is pushed up to the upper limit position. While the rear end of the hood 13 descends, the head portion 52H of the push-up rod 52 slidingly contacts from the flat plate portion 60H to the arm intermediate curved portion 60W so as to gradually absorb the impact, similar to the slide contacting operation from the flat plate portion 34 to the arm intermediate curved portion 32W in the first embodiment.

Figure 17:
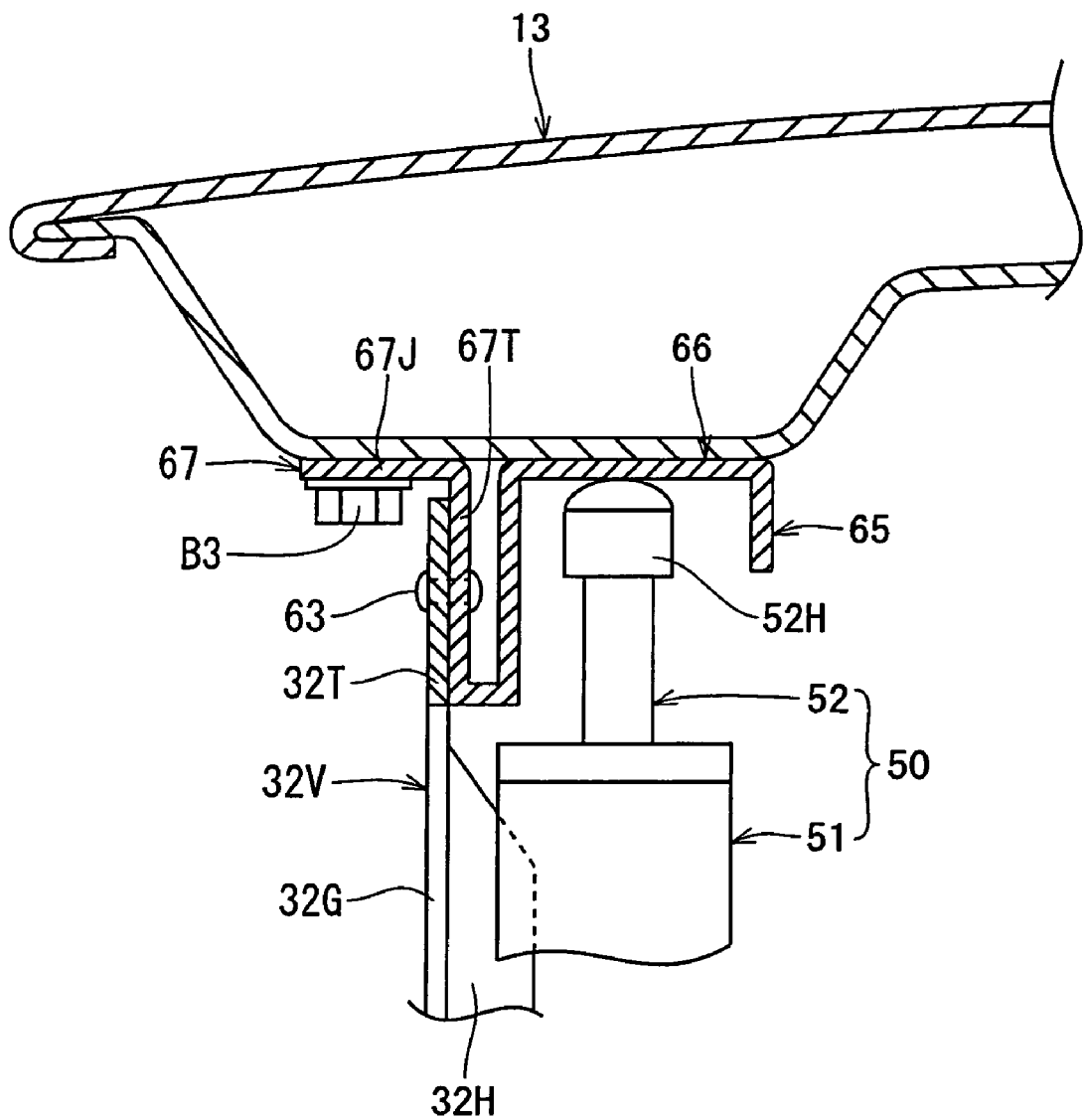
FIG. 17 is a front cross-sectional view of a rod slide contact member of a third embodiment.

A third embodiment, which is shown in FIG. 17, differs only in a rod slide contact member 65, from the second embodiment. The rod slide contact member 65 has an angular-groove structured rod slide contact portion 66 with an undersurface thereof opened. After the lower end of one side wall of the rod slide contact portion 66 is folded to the upper side, it is further folded to the lateral side of a side apart from the rod slide contact portion 66, whereby a bolt fixing portion 67 is formed. An upper plate wall 67J of the bolt fixing portion 67 is fixed by a bolt B3 on the undersurface of the hood 13. To a vertical wall 67T suspended from the upper plate wall 67J, the joint protrusion piece 32T of the hinge arm 32V is joined. Further, the head portion 52H of the push-up rod 52 slidingly contacts and moves along the inner surface of the rod slide contact portion 66. According to this configuration, the interference between the head portion 52H of the push-up rod 52 and the fixing bolt B3 can reliably be avoided.

Figure 18:
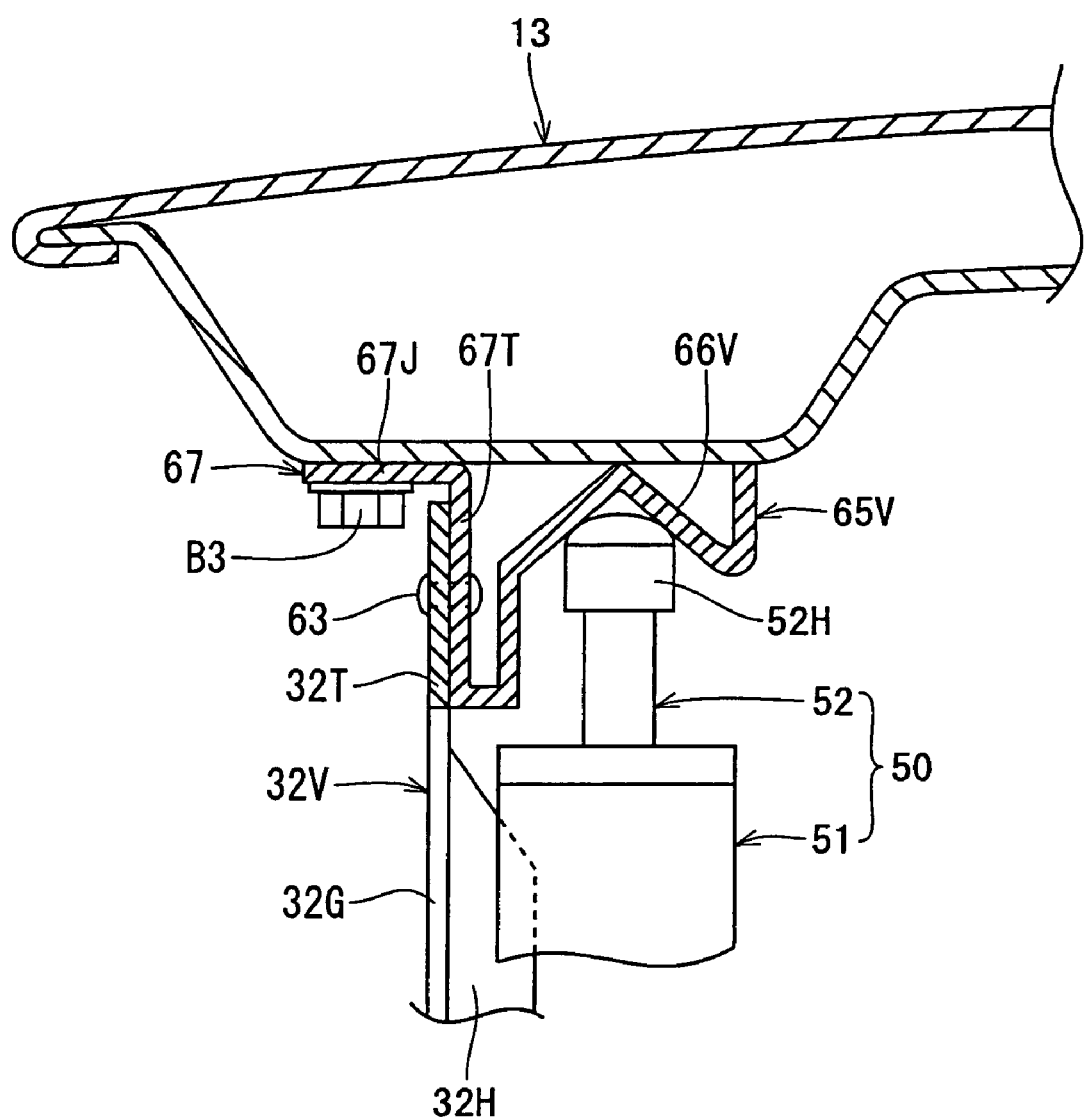
FIG. 18 is a front cross-sectional view of a rod slide contact member of a fourth embodiment.

A rod slide contact member 65V of a fourth embodiment, which is shown in FIG. 18, differs only in structure of a rod slide contact portion 66V, from the third embodiment. In the rod slide contact portion 66V, a portion for receiving the head portion 52H of the push-up rod 52 is of a Vshape in cross section. The head portion 52H of the push-up rod 52 is supported at two points on a V-shaped inner surface of the rod slide contact portion 66V, and slidingly contacts and moves. According to this configuration, a direction in which the head portion 52H of the push-up rod 52 slidingly contacts and moves is stabilized.

Figure 19:
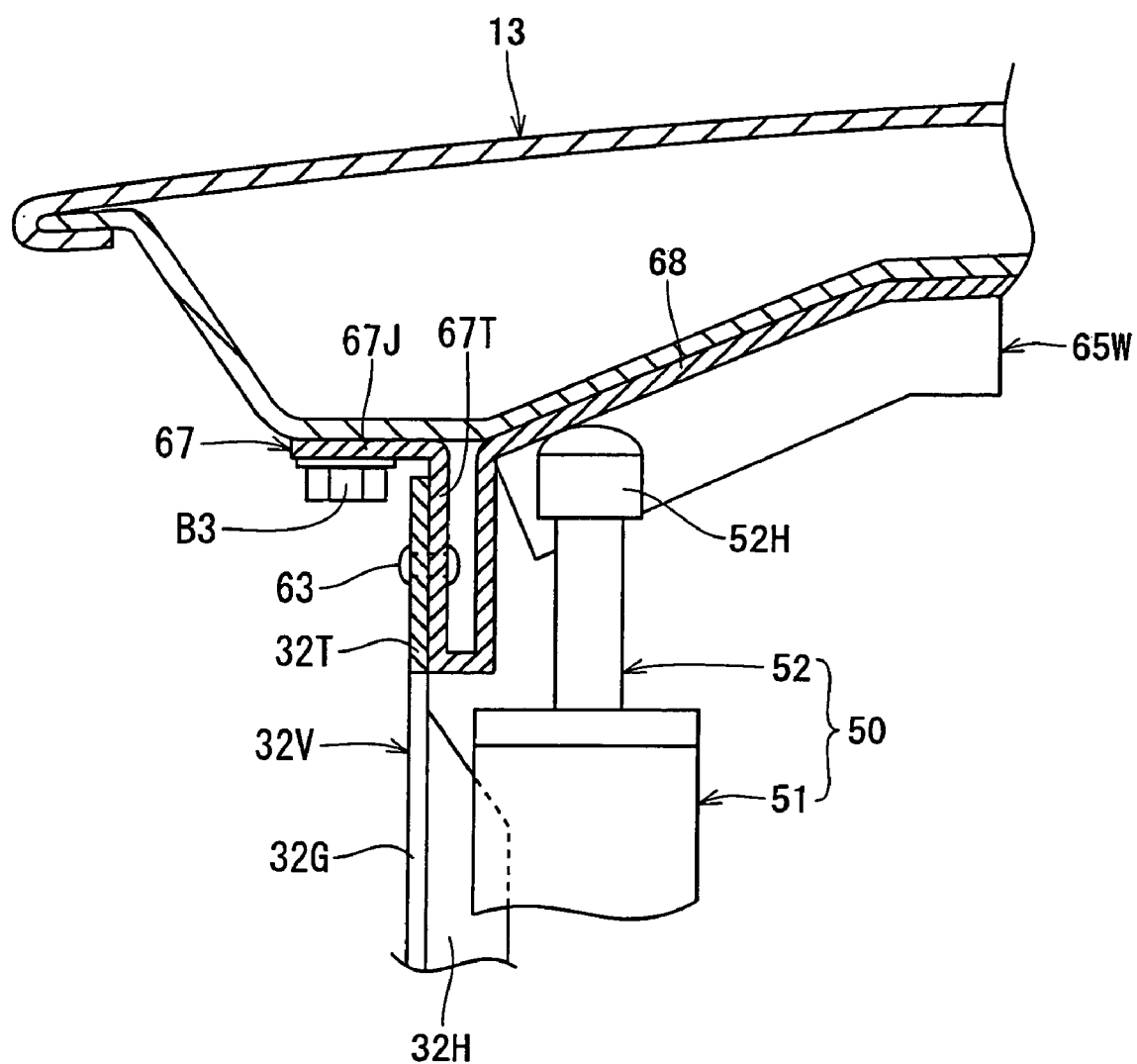
FIG. 19 is a front cross-sectional view of a rod slide contact member of a fifth embodiment.

A rod slide contact member 65W of a fifth embodiment, which is shown in FIG. 19, differs only in configuration of a rod slide contact portion 68, from the third embodiment. The rod slide contact portion 68 of the fifth embodiment extends from the bolt fixing portion 67 toward the center in the lateral direction of the hood 13. The cross section is of an angular-groove shape, for example. The rod slide contact portion 68 extends obliquely upward as it moves away from the bolt fixing portion 67, is bent in the midway thereof, and then extends approximately horizontally laterally. With this configuration as well, the same effects as those in the first embodiment can be exhibited.

Figure 20:
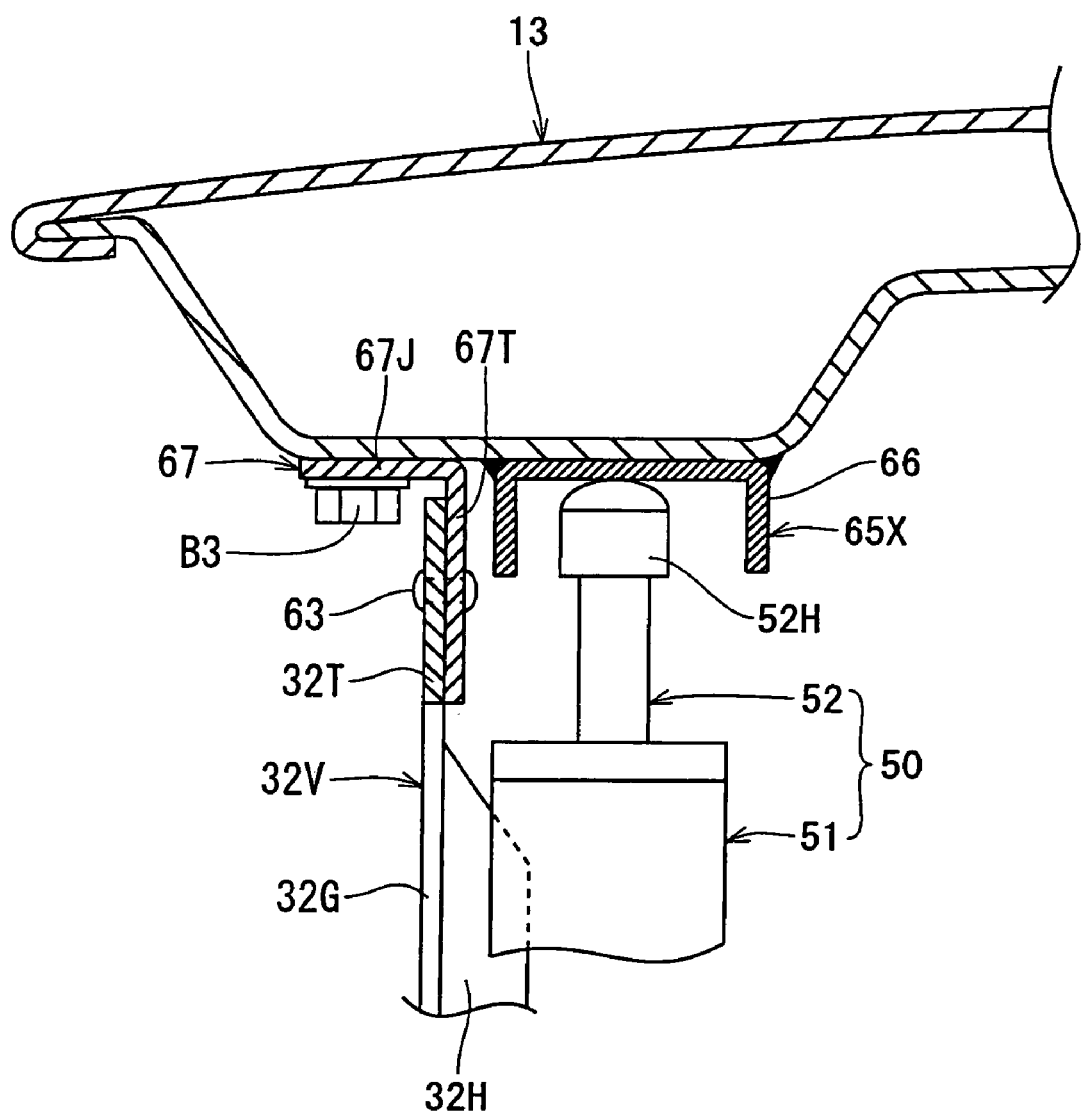
FIG. 20 is a front cross-sectional view of a rod slide contact member of a sixth embodiment.

A rod slide contact member 65X of a sixth embodiment, which is shown in FIG. 20, is structured in such a manner different from the third embodiment that the bolt fixing portion 67 and the rod slide contact portion 66 are separate components, and the rod slide contact portion 66 is welded on the undersurface of the hood 13. With this configuration as well, the same effects as those in the third embodiment can be exhibited.

The present invention is not limited to the aforementioned embodiments and embodiments described below, for example, are included in the technical scope of the present invention. Further, in addition to the following embodiments, it is possible to carry out the present invention with a variety of modifications without departing from the gist of the present invention.

(1) In the aforementioned embodiments, by guiding in the lateral direction, the arm intermediate curved portion 32W diverts the push-up rod 52 to the load liberating portion 13X (see FIG. 14) on the lateral side of the hinge arm 32. However, for example, it may be configured such that a through-hole is arranged on the arm lateral wall 32H of the hinge arm 32, and the push-up rod 52 can be diverted to the through-hole.

(2) It may also be possible that the push-up rod 52 of the first embodiment is incorporated into the cylinder 51 in an unrotatable manner, and the push-up rod 52 is slidedly contacted and guided by the arm intermediate curved portion 32W such that the proximal end of the push-up rod 52 is twist-deformed in a state where the proximal end of the push-up rod 52 is bent.

(3) It may also be possible that a direction in which the push-up rod 52 according to the present invention is pushed and bent by the hood 13 and a direction in which the head portion 52H of the push-up rod 52 slidingly contacts and moves are any one of rearward, forward, lateral, obliquely forward, and obliquely rearward of the vehicle 10.

DESCRIPTION OF REFERENCE NUMERALS

10: Vehicle
10H: Vehicle main body
12: Engine room
13: Hood
13X: Load liberating portion
32, 32V: Hinge arm
32W, 60W: Arm intermediate curved portion (second slide contact portion)
33: Hinge deformed portion
34, 60H: Flat plate portion
34F: Front-side flat portion (ascending slide contact portion)
34R: Rear-side flat portion (first slide contact portion)
35A, 35B, 35C: Reinforcement rib
37: Slit
40: Hood impact absorbing apparatus
50: Actuator
52: Push-up rod
52H: Head portion (distal end)
60, 65, 65V, 65W, 65X: Rod slide contact member
66, 66V, 68: Rod slide contact portion
90: Pedestrian (collision body)
V1: First vector
V2: Second vector
θ: Slide contact angle

The invention claimed is:

1. A hood impact absorbing apparatus configured such that a rear end of a hood is pushed up at the time of a collision of a vehicle, and when a collision body is battered against a top surface of the hood, descending of the rear end of the hood is permitted so as to mitigate an impact to the collision body, the hood impact absorbing apparatus, comprising:

an actuator incorporated into a vehicle main body except for the hood in the vehicle;

a push-up rod arranged movably on the actuator, standing by at a standby position below the hood at a normal time, held after being moved to an actuating position above the standby position at the time of a collision of the vehicle and bringing the rear end of the hood into a state of being pushed up to an upper limit position;

a first slide contact portion provided on the hood, contacted with a distal end of the push-up rod, slidingly contacting and moving the distal end of the push-up rod and folding a proximal end of the push-up rod while the rear end of the hood descends from the upper limit position, and formed so as to decrease a slide contact angle (θ) that is an angle formed between a first vector oriented to a slide contact movement direction of the distal end of the push-up rod and a second vector oriented from the proximal end of the push-up rod to the distal end as the slide contact movement advances; and a second slide contact portion along which the distal end of the push-up rod having passed through the first slide contact portion slidingly contacts and moves and which is larger in slide contact angle (θ) than a terminal end of the first slide contact portion.

2. The hood impact absorbing apparatus according to claim 1, comprising:

the second slide contact portion receiving the distal end of the push-up rod in a slide contact movement direction in the terminal end of the first slide contact portion and guiding the distal end of the push-up rod in a lateral direction relative to the slide contact movement direction in the terminal end of the first slide contact portion.

3. The hood impact absorbing apparatus according to claim 1, comprising:

the first slide contact portion inclined upward toward the back along an undersurface of the hood, in a state where the rear end of the hood is pushed up to the upper limit position;

the second slide contact portion bent downward from the rear end of the first slide contact portion so as to be inclined or curved downward toward the back; and the push-up rod having the distal end slidingly contacting and moving along the first slide contact portion rearward.

4. The hood impact absorbing apparatus according to claim 2, comprising:

the first slide contact portion inclined upward toward the back along an undersurface of the hood, in a state where the rear end of the hood is pushed up to the upper limit position;

the second slide contact portion bent downward from the rear end of the first slide contact portion so as to be inclined or curved downward toward the back; and the push-up rod having the distal end slidingly contacting and moving along the first slide contact portion rearward.

5. The hood impact absorbing apparatus according to claim 3, comprising: the push-up rod ascending rearward and obliquely upward from the standby position to reach the actuating position.

6. The hood impact absorbing apparatus according to claim 4, comprising: the push-up rod ascending rearward and obliquely upward from the standby position to reach the actuating position.

7. The hood impact absorbing apparatus according to claim 1, further comprising:

a hinge arm having one end being fixed on an undersurface of the rear end of the hood and the other end being joined rotatably with respect to the vehicle main body, and rotating integrally with the hood to enable the front end of the hood to move upward when the front end of the hood is detached from the vehicle main body; and a hinge deformed portion arranged in one end on a side of the hood in the hinge arm, and mitigating an impact by deforming in a bent state when the rear end of the hood moves to the upper limit position and by deforming to a side into which the bending is restored while the rear end of the hood moves downward from the upper limit position.

8. The hood impact absorbing apparatus according to claim 2, further comprising:

a hinge arm having one end being fixed on an undersurface of the rear end of the hood and the other end being joined rotatably with respect to the vehicle main body, and rotating integrally with the hood to enable the front end of the hood to move upward when the front end of the hood is detached from the vehicle main body; and a hinge deformed portion arranged in one end on a side of the hood in the hinge arm, and mitigating an impact by deforming in a bent state when the rear end of the hood moves to the upper limit position and by deforming to a side into which the bending is restored while the rear end of the hood moves downward from the upper limit position.

9. The hood impact absorbing apparatus according to claim 3, further comprising:

a hinge arm having one end being fixed on an undersurface of the rear end of the hood and the other end being joined rotatably with respect to the vehicle main body, and rotating integrally with the hood to enable the front end of the hood to move upward when the front end of the hood is detached from the vehicle main body; and a hinge deformed portion arranged in one end on a side of the hood in the hinge arm, and mitigating an impact by deforming in a bent state when the rear end of the hood moves to the upper limit position and by deforming to a side into which the bending is restored while the rear end of the hood moves downward from the upper limit position.

10. The hood impact absorbing apparatus according to claim 7, further comprising:

a flat plate portion arranged in the hinge deformed portion, overlaid and fixed on an undersurface of the rear end of the hood, and deformed in a bent state when the rear end of the hood moves to the upper limit position; and reinforcement ribs erected upright from the flat plate portion and having a slit at a position corresponding to a bent portion of the flat plate portion.

11. The hood impact absorbing apparatus according to claim 8, further comprising:

a flat plate portion arranged in the hinge deformed portion, overlaid and fixed on an undersurface of the rear end of the hood, and deformed in a bent state when the rear end of the hood moves to the upper limit position; and reinforcement ribs erected upright from the flat plate portion and having a slit at a position corresponding to a bent portion of the flat plate portion.

12. The hood impact absorbing apparatus according to claim 9, further comprising:

a flat plate portion arranged in the hinge deformed portion, overlaid and fixed on an undersurface of the rear end of the hood, and deformed in a bent state when the rear end of the hood moves to the upper limit position; and reinforcement ribs erected upright from the flat plate portion and having a slit at a position corresponding to a bent portion of the flat plate portion.

13. The hood impact absorbing apparatus according to claim 7, further comprising:

a front-side flat portion arranged in the flat plate portion, overlaid and fixed on an undersurface of the rear end of the hood, and slidedly contacted and moved by the distal end of the push-up rod while the push-up rod moves from the standby position to the actuating position;

a rear-side flat portion arranged in the flat plate portion, normally continued flush with the front-side flat portion, bent downward from the front-side flat portion involved in the moving operation of the rear end of the hood to the upper limit portion, and slidedly contacted and moved by the distal end of the push-up rod having passing through the front-side flat portion while slidingly contacting and moving; and the arm intermediate curved portion downwardly curved from an end opposed to the front-side portion in the rear-side flat portion, and as the second slide contact portion, slidedly contacted and moved by the distal end of the push-up rod having passed through the rear-side flat portion as the first slide contact portion while slidingly contacting and moving, when the rear end of the hood descends from the upper limit position.

14. The hood impact absorbing apparatus according to claim 10, further comprising:

a front-side flat portion arranged in the flat plate portion, overlaid and fixed on an undersurface of the rear end of the hood, and slidedly contacted and moved by the distal end of the push-up rod while the push-up rod moves from the standby position to the actuating position;

a rear-side flat portion arranged in the flat plate portion, normally continued flush with the front-side flat portion, bent downward from the front-side flat portion involved in the moving operation of the rear end of the hood to the upper limit portion, and slidedly contacted and moved by the distal end of the push-up rod having passing through the front-side flat portion while slidingly contacting and moving; and the arm intermediate curved portion downwardly curved from an end opposed to the front-side portion in the rear-side flat portion, and as the second slide contact portion, slidedly contacted and moved by the distal end of the push-up rod having passed through the rear-side flat portion as the first slide contact portion while slidingly contacting and moving, when the rear end of the hood descends from the upper limit position.

15. The hood impact absorbing apparatus according to claim 1, further comprising:

an ascending slide contact portion arranged opposite to the second slide contact portion while sandwiching the first slide contact portion with the second slide contact portion, slidingly contacting the distal end of the push-up rod while the push-up rod moves from the standby position to the actuating position, and causing the distal end of the push-up rod to move toward the first slide contact portion.

16. The hood impact absorbing apparatus according to claim 2, further comprising:

an ascending slide contact portion arranged opposite to the second slide contact portion while sandwiching the first slide contact portion with the second slide contact portion, slidingly contacting the distal end of the push-up rod while the push-up rod moves from the standby position to the actuating position, and causing the distal end of the push-up rod to move toward the first slide contact portion.

17. The hood impact absorbing apparatus according to claim 3, further comprising:

an ascending slide contact portion arranged opposite to the second slide contact portion while sandwiching the first slide contact portion with the second slide contact portion, slidingly contacting the distal end of the push-up rod while the push-up rod moves from the standby position to the actuating position, and causing the distal end of the push-up rod to move toward the first slide contact portion.

18. The hood impact absorbing apparatus according to claim 1, further comprising:

a load liberating portion for liberating the push-up rod from load involved in descending of the hood, ahead of the slide contact movement direction in the second slide contact portion.

19. The hood impact absorbing apparatus according to claim 2, further comprising:

a load liberating portion for liberating the push-up rod from load involved in descending of the hood, ahead of the slide contact movement direction in the second slide contact portion.

20. The hood impact absorbing apparatus according to claim 3, further comprising:

a load liberating portion for liberating the push-up rod from load involved in descending of the hood, ahead of the slide contact movement direction in the second slide contact portion.

\* \* \* \* \*